(12) United States Patent
Gebhardt et al.

(10) Patent No.: US 12,435,065 B2
(45) Date of Patent: Oct. 7, 2025

(54) CRYSTALLINE FORMS OF 1-(1,2-DIMETHYLPROPYL)-N-ETHYL-5-METHYL-N-PYRIDAZIN-4-YL-PYRAZOLE-4-CARBOXAMIDE

(71) Applicant: BASF SE, Ludwigshafen (DE)

(72) Inventors: Joachim Gebhardt, Ludwigshafen (DE); Martin Viertelhaus, Ludwigshafen (DE); Tiziana Chiodo, Ludwigshafen (DE); Michael Rack, Ludwigshafen (DE); Eric George Klauber, Huntsville, AL (US); Wen Xu, Research Triange Park, NC (US); Roland Goetz, Ludwigshafen (DE); Florian Vogt, Ludwigshafen (DE); Birgit Gockel, Ludwigshafen (DE); Sebastian Soergel, Limburgerhof (DE)

(73) Assignee: BASF SE, Ludwigshafen (DE)

( * ) Notice: Subject to any disclaimer, the term of this patent is extended or adjusted under 35 U.S.C. 154(b) by 923 days.

(21) Appl. No.: 17/311,403

(22) PCT Filed: Jan. 10, 2020

(86) PCT No.: PCT/EP2020/050493
§ 371 (c)(1),
(2) Date: Jun. 7, 2021

(87) PCT Pub. No.: WO2020/144308
PCT Pub. Date: Jul. 16, 2020

(65) Prior Publication Data
US 2022/0024898 A1   Jan. 27, 2022

(30) Foreign Application Priority Data
Jan. 11, 2019 (EP) .................... 19151447

(51) Int. Cl.
C07D 403/12 (2006.01)
A01N 43/58 (2006.01)
A01P 7/04 (2006.01)

(52) U.S. Cl.
CPC ........... *C07D 403/12* (2013.01); *A01N 43/58* (2013.01); *A01P 7/04* (2021.08); *C07B 2200/13* (2013.01)

(58) Field of Classification Search
CPC ......... C07D 403/12; A01P 7/04; A01N 43/58; C07B 2200/13
See application file for complete search history.

(56) References Cited

U.S. PATENT DOCUMENTS

2003/0124028 A1* 7/2003 Carlson ............... C40B 60/14
422/68.1

FOREIGN PATENT DOCUMENTS

WO   WO-2012143317 A1 * 10/2012  ............ A01N 43/56
WO   WO-2018/082964 A1   5/2018

OTHER PUBLICATIONS

Olenik et al., Polymorphism and the Organic Solid State: Influence on the Optimization of Agrochemicals, chapter 10 In: Jeschke et al. (eds), Modern Methods in Crop Protection Research, Wiley-VCH (2012).
Ito, Improvement of active ingredient properties by co-crystallization, Abstracts of Japan Agricultural Formulation and Application Symposium, 33:41 (2013).
Organic Compound Crystal Produced Handbook—Principles and Expertise, pp. 37-55 (2008).
International Application No. PCT/EP2020/050493, International Search Report and Written Opinion, mailed Mar. 6, 2020.
International Application No. PCT/EP2020/050493, International Preliminary Report on Patentability, dated Nov. 6, 2020.
Bryn et al., Pharmaceutical solids: a strategic approach to regulatory considerations. Pharm. Res., 12(7):945-54 (1995).
Bavin, Polymorphism in process development, Chemistry & Industry, pp. 527-529 (Aug. 21, 1989).
Carlson et al., An integrated high throughput workflow for pre-formulations: polymorph and salt selection studies, Pharm. Chem. Drug Development, pp. 10-15 (Jul./Aug. 2003).
Caira, Crystalline polymorphism of organic compounds, Topics in Current Chemistry, vol. 198, Springer Publishing (1998).

* cited by examiner

*Primary Examiner* — James H Alstrum-Acevedo
*Assistant Examiner* — Pierre Paul Eleniste
(74) *Attorney, Agent, or Firm* — MARSHALL, GERSTEIN & BORUN LLP

(57) ABSTRACT

The present invention relates to a novel crystalline form of 1-(1,2-dimethylpropyl)-N-ethyl-5-methyl-N-pyridazin-4-yl-pyrazole-4-carboxamide recently assigned the common name dimpropyridaz. The invention also relates to the use of the crystalline form B for combating invertebrate pests and to formulations for plant protection which contain the crystalline form B of 1-(1,2-dimethylpropyl)-N-ethyl-5-methyl-N-pyridazin-4-yl-pyrazole-4-carboxamide. The crystalline form B according to the present invention can be identified by powder X-ray diffractometry on the basis of its powder X-ray diffraction diagram, hereinafter also termed powder X-ray diffraction pattern or PXRD pattern, of the polymorph form B recorded using Cu—K$\alpha$ radiation (1.54178 Å) at 25° C. displays the 3 following reflections, quoted as 2$\theta$ values: 20.69±0.10°, 24.15±0.10° and 30.52±0.10°. In addition to these 3 reflections, the polymorph B of the present invention may display in such a PXRD pattern one or more, in particular at least 2, often at least 4, in particular at least 6 or at least 8 reflections and especially all of the reflections quoted hereinafter as 2$\theta$ values: 7.99±0.10°, 10.07±0.10°, 12.38±0.10°, 15.31±0.10°, 15.97±0.10°, 16.50±0.10°, 18.03±0.10°, 19.29±0.10°, 20.22±0.0.10°, 20.96±0.10°, 23.40±0.10°, 23.70±0.10°, 26.09±0.10°, 27.26±0.10° and 32.91±0.10°.

13 Claims, 5 Drawing Sheets

CRYSTALLINE FORMS OF 1-(1,2-DIMETHYLPROPYL)-N-ETHYL-5-METHYL-N-PYRIDAZIN-4-YL-PYRAZOLE-4-CARBOXAMIDE

CROSS-REFERENCE TO RELATED APPLICATIONS

This is the U.S. national phase of International Application No. PCT/EP2020/050493, filed Jan. 10, 2020, which claims the benefit of European Patent Application No. 19151447.0, filed on Jan. 11, 2019.

The present invention relates to a novel crystalline form of 1-(1,2-dimethylpropyl)-N-ethyl-5-methyl-N-pyridazin-4-yl-pyrazole-4-carboxamide recently assigned the common name dimpropyridaz. The invention also relates to the use of the crystalline form B for combating invertebrate pests and to formulations for plant protection which contain the crystalline form B of 1-(1,2-dimethylpropyl)-N-ethyl-5-methyl-N-pyridazin-4-yl-pyrazole-4-carboxamide.

1-(1,2-Dimethylpropyl)-N-ethyl-5-methyl-N-pyridazin-4-yl-pyrazole-4-carboxamide is the pesticidally active substance of the formula I which has a center of chirality and thus may be present as a racemic form depicted in formula (I) but also in the form of its enantiomers of the formulae I-R and I-S or as non-racemic mixtures thereof (see ip.com IPCOM000256756D).

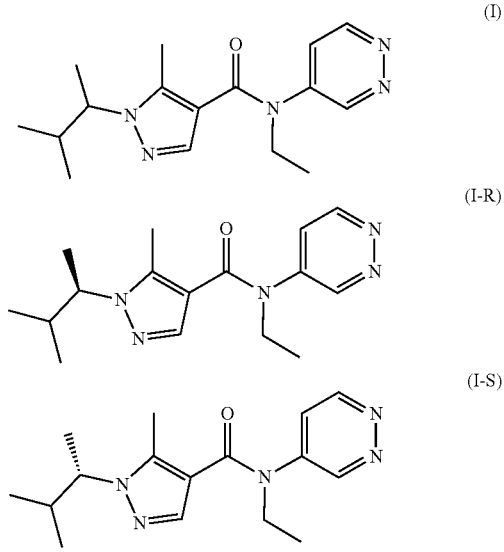

1-(1,2-Dimethylpropyl)-N-ethyl-5-methyl-N-pyridazin-4-yl-pyrazole-4-carboxamide, its activity against arthropod pests and general procedures for its production are known from WO 2012/143317. Applying these general procedures to the production of 1-(1,2-dimethylpropyl)-N-ethyl-5-methyl-N-pyridazin-4-yl-pyrazole-4-carboxamide yield this compound as a glassy melt, which contains the crystalline form A described below.

For the production of active substances on the industrial scale, but also for the formulation of active substances, in many cases knowledge concerning the possible existence of crystalline modifications, also described as crystalline forms or polymorphs, or of solvates (pseudo polymorphs) of the active substance in question, and knowledge of the specific properties of such modifications and solvates and of methods for their preparation are of decisive importance. A range of active substances can exist in different crystalline but also in amorphous modifications. Polymorphism is the term used in these cases. A polymorph is a solid, crystalline phase of a compound which is characterized by a specific, uniform packing and arrangement of the molecules in the solid.

Different modifications of one and the same active substance can sometimes have different properties, for example differences in the following properties: solubility, vapor pressure, dissolution rate, stability against a phase change into a different modification, stability during grinding, suspension stability, optical and mechanical properties, hygroscopicity, crystal form and size, filterability, density, melting point, stability to decomposition, color and sometimes even chemical reactivity or biological activity.

The applicant's own attempts to isolate 1-(1,2-dimethylpropyl)-N-ethyl-5-methyl-N-pyridazin-4-yl-pyrazole-4-carboxamide into a crystalline solid by crystallization at first resulted in a crystalline material, which could only be handled with difficulty and whose stability against uncontrolled phase change was unsatisfactory. This modification is also described below as form A. This instability of suspensions of the crystalline form A against uncontrolled phase change may adversely affect the production of formulations of 1-(1,2-dimethylpropyl)-N-ethyl-5-methyl-N-pyridazin-4-yl-pyrazole-4-carboxamide. Said instability of the crystalline form A against uncontrolled phase change may also impair the stability of pesticide formulations of form A or its capability of forming virtually homogeneous aqueous dilutions. This is, because during production, during storage or during dilution uncontrolled growth particle size may occur as a result of the phase change.

Now, a previously unknown stable crystalline form of 1-(1,2-dimethylpropyl)-N-ethyl-5-methyl-N-pyridazin-4-yl-pyrazole-4-carboxamide has been surprisingly found. This new crystalline form can be obtained in high purity by suitable processes. This crystalline form is also described below as crystalline form B or polymorph B, respectively. At least at room temperature this crystalline form B is thermodynamically more stable than the crystalline form A. In particular, the crystalline form B does not display the disadvantages of the crystalline form A.

Accordingly, a first object of the present invention relates to the crystalline form B of 1-(1,2-dimethylpropyl)-N-ethyl-5-methyl-N-pyridazin-4-yl-pyrazole-4-carboxamide as described herein.

A further object of the present invention is a solid 1-(1,2-dimethylpropyl)-N-ethyl-5-methyl-N-pyridazin-4-yl-pyrazole-4-carboxamide which consists of at least 90 wt. % in particular at least 95% of the crystalline form B with respect to the 1-(1,2-dimethylpropyl)-N-ethyl-5-methyl-N-pyridazin-4-yl-pyrazole-4-carboxamide contained in the solid.

The present invention also relates to a plant protection formulation containing the crystalline form B of 1-(1,2-dimethylpropyl)-N-ethyl-5-methyl-N-pyridazin-4-yl-pyrazole-4-carboxamide as defined herein and one or more carriers customary for the formulation of plant protection formulations.

The present invention especially relates to plant protection formulation containing 1-(1,2-dimethylpropyl)-N-ethyl-5-methyl-N-pyridazin-4-yl-pyrazole-4-carboxamide and one or more carriers customary for the formulation of plant protection formulations, wherein the 1-(1,2-dimethylpropyl)-N-ethyl-5-methyl-N-pyridazin-4-yl-pyrazole-4-carboxamide contained in the formulation is essentially crystalline form B, i.e. the 1-(1,2-dimethylpropyl)-N-ethyl-5-methyl-N-pyridazin-4-yl-pyrazole-4-carboxamide contained in the formulation consists of at least 90 wt. %, in particular of at least 95 wt. % of the crystalline form B as defined herein.

The invention also relates to the following subject matter:

The use of the crystalline form B of 1-(1,2-dimethylpropyl)-N-ethyl-5-methyl-N-pyridazin-4-yl-pyrazole-4-carboxamide as herein or of a plant protection formulation as defined herein for combating or controlling invertebrate pests;

The use of the crystalline form B of 1-(1,2-dimethylpropyl)-N-ethyl-5-methyl-N-pyridazin-4-yl-pyrazole-4-carboxamide as defined herein or of a plant protection formulation as defined herein for protecting crops, plants or plant propagation material from attack or infestation by invertebrate pests;

A method for combating or controlling invertebrate pests which method comprises contacting said pest or its food supply, or its habitat or breeding ground with the crystalline form B of 1-(1,2-dimethylpropyl)-N-ethyl-5-methyl-N-pyridazin-4-yl-pyrazole-4-carboxamide as defined herein; and A method for protecting crops, plants or plant propagation material from attack or infestation by invertebrate pests which method comprises contacting said crops, growing plants or plant propagation material or the soil or water in which the plant is growing with the crystalline form B of 1-(1,2-dimethylpropyl)-N-ethyl-5-methyl-N-pyridazin-4-yl-pyrazole-4-carboxamide as defined herein.

As a consequence of its thermodynamic stability, the crystalline form B according to the present invention is easier to handle than the previously known crystalline form A of 1-(1,2-dimethylpropyl)-N-ethyl-5-methyl-N-pyridazin-4-yl-pyrazole-4-carboxamide. During production the crystalline form B is obtained in the form of discrete crystals or crystallites, which do not suffer from an uncontrolled phase change and a resulting increase in particle size. In particular, formulations of the crystalline form B and particularly formulations of the pure crystalline form B display an increased stability with regard to conversion into another solid form and consequently an increased stability against particle size increase and resulting formulation or dilution instabilities. In particular, the stability of a formulation, which contains 1-(1,2-dimethylpropyl)-N-ethyl-5-methyl-N-pyridazin-4-yl-pyrazole-4-carboxamide essentially as crystalline form B, is markedly higher than the stability of a formulation which contains crystalline form A of 1-(1,2-dimethylpropyl)-N-ethyl-5-methyl-N-pyridazin-4-yl-pyrazole-4-carboxamide.

Here and throughout the specification, the terms "form B", "modification B", "polymorph B" and "crystalline form B" are used synonymously and relate to the crystalline form B of 1-(1,2-dimethylpropyl)-N-ethyl-5-methyl-N-pyridazin-4-yl-pyrazole-4-carboxamide as defined herein. Likewise, the terms "form A", "modification A", "polymorph A" and "crystalline form A" are used synonymously and relate to the crystalline form A of 1-(1,2-dimethylpropyl)-N-ethyl-5-methyl-N-pyridazin-4-yl-pyrazole-4-carboxamide as defined herein.

The terms "pure form B", "pure polymorph B", and "pure crystalline form B" should be understood to mean that the proportion of the polymorph B in a solid form of 1-(1,2-dimethylpropyl)-N-ethyl-5-methyl-N-pyridazin-4-yl-pyrazole-4-carboxamide is at least 90 wt. % and in particular at least 95 wt. %, based on the total amount of 1-(1,2-dimethylpropyl)-N-ethyl-5-methyl-N-pyridazin-4-yl-pyrazole-4-carboxamide present in the solid. In other words, "pure form B" means that a solid form of 1-(1,2-dimethylpropyl)-N-ethyl-5-methyl-N-pyridazin-4-yl-pyrazole-4-carboxamide does not contain more than 10 wt. % and especially not more than 5 wt. % of any solid form different from the polymorph B, based on the total amount of 1-(1,2-dimethylpropyl)-N-ethyl-5-methyl-N-pyridazin-4-yl-pyrazole-4-carboxamide present in the solid.

The polymorph B according to the present invention can be identified by powder X-ray diffractometry on the basis of its powder X-ray diffraction diagram, hereinafter also termed powder X-ray diffraction pattern or PXRD pattern, of the polymorph form B recorded using Cu—Kα radiation (1.54178 Å) at 25° C. displays the 3 following reflections, quoted as 2θ values: 20.69±0.10°, 24.15±0.10° and 30.52±0.10°. In addition to these 3 reflections, the polymorph B of the present invention may display in such a PXRD pattern one or more, in particular at least 2, often at least 4, in particular at least 6 or at least 8 reflections and especially all of the reflections quoted hereinafter as 2θ values: 7.99±0.10°, 10.07±0.10°, 12.38±0.10°, 15.31±0.10°, 15.97±0.10°, 16.50±0.10°, 18.03±0.10°, 19.29±0.10°, 20.22±0.10°, 20.96±0.10°, 23.40±0.10°, 23.70±0.10°, 26.09±0.10°, 27.26±0.10° and 32.91±0.10°.

From amongst these reflections, preferably at least 1, in particular at least 2, more particularly at least 4, especially at least 6 or all of the following reflections, quoted as 2θ values, can be observed in such a PXRD pattern: 10.07±0.10°, 15.31±0.10°, 15.97±0.10°, 16.50 0.10°, 19.29±0.10°, 20.22±0.10°, 20.96±0.10° and 26.09±0.10°. In addition to these reflections preferably least 1, in particular at least 2, more particularly at least 4, especially at least 6 or all of the following reflections, quoted as 2θ values, can be observed in such a PXRD pattern: 7.99±0.10°, 12.38±0.10°, 18.03±0.10°, 23.40 0.10°, 23.70±0.10°, 27.26±0.10° and 32.91±0.10°.

Frequently, a PXRD pattern of the polymorph form B recorded using Cu—Kα radiation (1.54178 Å) at 25° C. displays the 3 following reflections, quoted as 2θ values: 20.69±0.10°, 24.15±0.10° and 30.52±0.10° and additionally the following reflections, quoted as 2θ values: 15.31±0.10°, 15.97±0.10° and 16.50±0.10°.

Alternatively, a PXRD pattern of the polymorph form B recorded using Cu—Kα radiation (1.54178 Å) at 25° C. displays the 3 following reflections, quoted as 2θ values: 20.69±0.10°, 24.15±0.10° and 30.52±0.10° and additionally the following reflections, quoted as 2θ values: 23.40±0.10° and 23.70±0.10°.

In particular, a PXRD pattern of the polymorph form B recorded using Cu—Kα radiation (1.54178 Å) at 25° C. displays the 3 following reflections, quoted as 2θ values: 20.69±0.10°, 24.15±0.10° and 30.52±0.10° and additionally the following reflections, quoted as 2θ values: 15.31±0.10°, 15.97±0.10°, 16.50±0.10°, 23.40±0.10° and 23.70±0.10°.

X-ray studies at 100 K on a single crystal of polymorph B demonstrate that the underlying crystal structure is monoclinic. The unit cell has the space group $P2_1$. Structure resolution of the thus obtained single crystal X-ray data revealed that the unit cell contains 2 molecules of 1-(1,2-dimethylpropyl)-N-ethyl-5-methyl-N-pyridazin-4-yl-pyrazole-4-carboxamide and not solvent molecules. The asymmetric unit of the crystal structure contains a single molecule of 1-(1,2-dimethylpropyl)-N-ethyl-5-methyl-N-pyridazin-4-yl-pyrazole-4-carboxamide. While the X-ray diffraction pattern calculated from the single crystal X-ray diffraction data obtained at 100 K is different from the powder X-ray diffraction pattern experimentally determined at 25° C., a good match between the calculated and the measured PXRD pattern can be achieved by fitting of the unit cell dimensions to the PXRD data.

The characteristic data of the crystal structure of polymorph B, determined at 100 K, are compiled in the following table 1. Additionally, the values calculated from the powder X-ray reflection data obtained at 25° C. are given.

TABLE 1

Crystallographic characteristics of polymorph B

| Parameter | Polymorph B | |
|---|---|---|
| | Single Crystal Data | Powder X-Ray Data |
| class | monoclinic | monoclinic |
| space group | P2$_1$ | P2$_1$/n |
| a (Å) | 11.1315(5) | 11.35(2) |
| b (Å) | 6.7075(3) | 6.76(1) |
| c (Å) | 11.1987(5) | 11.29(1) |
| α | 90° | 90° |
| β | 102.2190(10)° | 11.29(1) |
| γ | 90° | 90° |
| Z | 2 | 2 |
| wavelength | 1.54178 Å | 1.54178 Å |
| temperature | 100 K | 298 K |
| Calculated data | | |
| volume (Å$^3$) | 817.20(6) | |
| density (g/m$^3$) | 1.225 | |
| R factor (%) | 6.73 | | a, b, c = unit cell length
α, β, γ = unit cell angle
Z = number of molecules in the unit cell When analyzed by differential scanning calorimetry (DSC) form B of the present invention displays a thermogram with a characteristic endothermic peak, also referred to as melting peak. The melting point, determined as the onset of the melting peak, typically lies in the range from about 80° C. to 90° C., in particular in the range from 82° C. to 89° C. The values quoted here relate to values determined by DSC using an aluminum closed cup with a sample size of 1-10 mg and applying a heating rate of 10 K/min.

Thermogravimetric analysis, hereinafter also referred to as TGA, revealed that no weight loss occurs on heating, which confirmed the findings of the single crystal X-ray studies that form B does not contain solvent.

A $^{13}$C solid state NMR spectrum of form B shows the following resonance peaks against the standard tetramethylsilane (TMS, 1% in CDCl$_3$): 165.3±0.3, 152.7±0.3, 149.9±0.3, 141.9±0.3, 141.1±0.3, 119.7±0.3, 118.9±0.3, 113.8±0.3, 61.2±0.3, 60.4±0.3, 39.8±0.3, 32.9±0.3, 31.9±0.3, 21.4±0.3, 19.4±0.3, 17.9±0.3, 16.3±0.3, 12.8±0.3, 9.4±0.3 and 9.0±0.3 ppm. The pairs of resonance peaks given in the following table show a significant overlap with centers also given in table 2:

TABLE 2

| Pair of peaks [ppm] | Centre of peaks [ppm] |
|---|---|
| 141.9 ± 0.3; 141.1 ± 0.3 | 141.5 ± 0.9 |
| 119.7 ± 0.3; 118.9 ± 0. | 119.3 ± 0.9 |
| 61.2 ± 0.3; 60.4 ± 0.3 | 60.8 ± 0.9 |
| 32.9 ± 0.3; 31.9 ± 0.3 | 32.4 ± 0.9 |
| 9.4 ± 0.3; 9.0 ± 0.3 | 9.2 ± 0.9 |

The resonance peaks reported herein were obtained by recording the $^{13}$C solid state NMR spectra at 25° C. (purge gas temperature) and 14.1 Tesla under Magic Angle Spinning with rotational speed of 10 kHz. Semi quantitative $^{13}$C solid state NMR spectra recorded with $^1$H-$^{13}$C cross polarization and quantitative $^{13}$C solid state NMR spectra recorded with $^{13}$C direct polarization reveal the same resonance peak positions within 0.1 ppm. The positions of the resonance peaks given here are the average of the positions measured in the semiquantitative spectrum and the quantitative spectrum. Semi quantitative $^{13}$C solid state NMR spectra were recorded at 25° C. and 14.1 Tesla under Magic Angle Spinning with rotational speed of 10 kHz with 3 ms $^1$H-$^{13}$C cross polarization and 2 s scan recycle delay. Quantitative $^{13}$C solid state NMR spectra were recorded with $^{13}$C direct polarization, e.g. 5 μs 90° pulse direct polarization and $^1$H heteronuclear dipolar decoupling, with 300 s scan recycle delay.

The habit and the relative intensities of a quantitative $^{13}$C solid state NMR spectrum are characteristic of form B in that the integral of the resonance peak at 19.4 ppm is 25.9%±2.0%, in particular 25.9%±1.4% and especially 25.9%±1.0% with respect to the total integral of the resonance peaks in the range from 20.4 to 18.6 ppm.

Form B of 1-(1,2-dimethylpropyl)-N-ethyl-5-methyl-N-pyridazin-4-yl-pyrazole-4-carboxamide invention can be obtained by crystallization from solutions of 1-(1,2-dimethylpropyl)-N-ethyl-5-methyl-N-pyridazin-4-yl-pyrazole-4-carboxamide in either ethyl acetate; or a mixture of n-butyl acetate and n-heptane, preferably in a volume ratio of n-butyl acetate to n-heptane in the range from 1:1 to 1:4; or a mixture of toluene and cyclohexane, preferably in a volume ratio of toluene to cyclohexane in the range from 1:2 to 1:6.

Crystallization of form B from its solution is preferably effected under controlled conditions, i.e. the conditions of the crystallization are chosen to achieve a slow crystallization rate. In particular, the crystallization of form B is effected by controlled cooling of a hot solution of 1-(1,2-dimethylpropyl)-N-ethyl-5-methyl-N-pyridazin-4-yl-pyrazole-4-carboxamide in one of the aforementioned solvents or solvent mixtures.

For this, in a first step i) a hot solution of 1-(1,2-dimethylpropyl)-N-ethyl-5-methyl-N-pyridazin-4-yl-pyrazole-4-carboxamide in one of the aforesaid organic solvents or solvent mixtures may be prepared, and then in a second step ii) crystallization of the 1-(1,2-dimethylpropyl)-N-ethyl-5-methyl-N-pyridazin-4-yl-pyrazole-4-carboxamide is effected by controlled cooling.

The temperature of the hot solution is usually at least 50° C. and especially in the range from 50 to 130° C. Naturally, the temperature of the hot solution will not exceed the boiling point of the solvent or solvent mixture. Frequently, the temperature of the hot solution will not exceed 100° C.

Controlled cooling means that the temperature of the solution is slowly lowered, e. g. by applying a cooling rate of at most 50 K/h and in particular at most 20 K/h. Frequently, the hot solution is cooled by applying a cooling rate in the range of 1 to 50 K/h, in particular in the range from 2 to 20 K/h. During cooling, the cooling rate may be constant but it is also possible to start at a low cooling rate and to increase the cooling rate, when crystallization has already begun. Likewise, it is possible to start the cooling with a high cooling rate until the temperature is close but higher than the temperature at which the concentration of 1-(1,2-dimethylpropyl)-N-ethyl-5-methyl-N-pyridazin-4-yl-pyrazole-4-carboxamide in the solution corresponds to the equilibrium concentration and then to lower the cooling rate. It is preferred that the crystallization starts at temperatures of at most 100° C., in particular at most 80° C., e.g. in the range from 30 to 100° C. in particular in the range from 40 to 80° C. In particular, the above cooling rates are applied at least in this temperature range.

The concentration of 1-(1,2-dimethylpropyl)-N-ethyl-5-methyl-N-pyridazin-4-yl-pyrazole-4-carboxamide in the solution used for the crystallization naturally depends on the nature of the solvent and the solution temperature and frequently lies in the range from 50 to 500 g/l. Suitable conditions can be determined by the person skilled in the art by routine experiments.

The solution used for the crystallization is preferably essentially free from solvents other than those stated. In this context, "essentially free" means that the concentration of other solvents in the 1-(1,2-dimethylpropyl)-N-ethyl-5-methyl-N-pyridazin-4-yl-pyrazole-4-carboxamide-containing solution does not exceed 10 wt. %, often 5 wt. %, based on the total quantity of solvent.

During the crystallization process the crystallization mixture, i.e. the solution of 1-(1,2-dimethylpropyl)-N-ethyl-5-methyl-N-pyridazin-4-yl-pyrazole-4-carboxamide and the mixture of crystalline 1-(1,2-dimethylpropyl)-N-ethyl-5-methyl-N-pyridazin-4-yl-pyrazole-4-carboxamide and solvent, may be stirred. However, it is principally not necessary to stir the mixture.

Usually, the crystallization mixture will be cooled to a temperature at which at least 80% or at least 90% of the 1-(1,2-dimethylpropyl)-N-ethyl-5-methyl-N-pyridazin-4-yl-pyrazole-4-carboxamide contained in the hot solution has crystallized. This temperature is frequently in the range from −20 to +30° C., in particular in the range from −10 to +20° C. It may be possible to concentrate the crystallization mixture, e.g. by evaporation of solvent, in order to increase the yield of form B.

Apart from that, the crystallization of form B can be performed by analogy to conventional crystallization processes for organic compounds using crystallization apparatuses well known in the art. Likewise, the separation of the crystalline form B can be performed by analogy to methods well established in the art, e.g. by filtration, decantation or centrifugation.

In a particular embodiment of the invention, the 1-(1,2-dimethylpropyl)-N-ethyl-5-methyl-N-pyridazin-4-yl-pyrazole-4-carboxamide used for preparing form B has a purity of at least 85%, often at least 90%, in particular at least 95%, i.e. the content of organic impurities which are not organic solvents is not more than 15 wt. %, often not more than 10 wt. %, and in particular not more than 5 wt. %, based on the 1-(1,2-dimethylpropyl)-N-ethyl-5-methyl-N-pyridazin-4-yl-pyrazole-4-carboxamide used for crystallization.

The solution of 1-(1,2-dimethylpropyl)-N-ethyl-5-methyl-N-pyridazin-4-yl-pyrazole-4-carboxamide can for example be prepared by the following methods:

(1) Dissolution of the 1-(1,2-dimethylpropyl)-N-ethyl-5-methyl-N-pyridazin-4-yl-pyrazole-4-carboxamide, preferably in a form different from form B, in one of the aforesaid organic solvents, or (2) Preparation of the 1-(1,2-dimethylpropyl)-N-ethyl-5-methyl-N-pyridazin-4-yl-pyrazole-4-carboxamide by a chemical reaction and transfer of the reaction mixture, if necessary after removal of reagents and/or side products, into an organic solvent suitable according to the invention.

For the preparation of the hot solution of the 1-(1,2-dimethylpropyl)-N-ethyl-5-methyl-N-pyridazin-4-yl-pyrazole-4-carboxamide, essentially any known form of 1-(1,2-dimethylpropyl)-N-ethyl-5-methyl-N-pyridazin-4-yl-pyrazole-4-carboxamide can be used. Frequently, crystalline form A of 1-(1,2-dimethylpropyl)-N-ethyl-5-methyl-N-pyridazin-4-yl-pyrazole-4-carboxamide described below will be used, but it is also possible to use form B or a mixture of form A and form B. 1-(1,2-Dimethylpropyl)-N-ethyl-5-methyl-N-pyridazin-4-yl-pyrazole-4-carboxamide used for the preparation of form B may be racemic or enriched with regard to one of its enantiomers. The 1-(1,2-dimethylpropyl)-N-ethyl-5-methyl-N-pyridazin-4-yl-pyrazole-4-carboxamide used for preparing the hot solution has frequently a purity of at least 85%, often at least 90%, in particular at least 95%.

The dissolution of the 1-(1,2-dimethylpropyl)-N-ethyl-5-methyl-N-pyridazin-4-yl-pyrazole-4-carboxamide is usually effected at an elevated temperature, in particular at 50° C., especially at a temperature in the range from 50 to 130° C. Naturally, the temperature used for dissolution will not exceed the boiling point of the solvent or solvent mixture. The hot solution is then subjected to controlled cooling as described herein.

The hot solution of the 1-(1,2-dimethylpropyl)-N-ethyl-5-methyl-N-pyridazin-4-yl-pyrazole-4-carboxamide can also be prepared by transferring a reaction mixture obtained by a chemical reaction, which contains the 1-(1,2-dimethylpropyl)-N-ethyl-5-methyl-N-pyridazin-4-yl-pyrazole-4-carboxamide, if necessary after removal of reagents and/or side products, into an organic solvent suitable according to the invention. This can be effected in such a manner that the reaction is performed in an organic solvent or solvent mixture which consists at least partly, preferably at least 50 wt. %, of a solvent suitable for the crystallization and, if necessary a workup is performed during which excess reagents and any catalysts present and any unsuitable solvents present, for example water from aqueous work-up and salts formed as byproducts, are removed. The preparation of a solution of the 1-(1,2-dimethylpropyl)-N-ethyl-5-methyl-N-pyridazin-4-yl-pyrazole-4-carboxamide by chemical reaction of a suitable precursor of 1-(1,2-dimethylpropyl)-N-ethyl-5-methyl-N-pyridazin-4-yl-pyrazole-4-carboxamide can be effected by analogy to the methods which are described in the state of the art cited at the beginning, to which full reference is hereby made.

The process for preparing form B yields 1-(1,2-dimethylpropyl)-N-ethyl-5-methyl-N-pyridazin-4-yl-pyrazole-4-carboxamide in high purity. In particular, the crystalline form B has a content of 1-(1,2-dimethylpropyl)-N-ethyl-5-methyl-N-pyridazin-4-yl-pyrazole-4-carboxamide of at least 94 wt. %, in particular at least 96%, especially at least 98%.

As stated above, 1-(1,2-dimethylpropyl)-N-ethyl-5-methyl-N-pyridazin-4-yl-pyrazole-4-carboxamide may also exist in a further crystalline form A, hereinafter termed polymorph A. The polymorph A can be identified and distinguished from form B by powder X-ray diffractometry. The PXRD pattern of the polymorph form A recorded using Cu—Kα radiation (1.54178 Å) at 25° C. displays at least 3 or all of the following reflections, quoted as 2θ values: 16.16±0.10°, 20.36±0.10°, 23.92±0.10°, 24.29±0.10° and 27.43±0.10°. These reflections are not present in the form B. In addition to these 5 reflections, the polymorph A may display in such a diagram one or more, in particular at least 2, often at least 4, in particular at least 6 or at least 8 reflections and especially all of the reflections quoted hereinafter as 2θ values: 7.95±0.10°, 10.16±0.10°, 12.40±0.10°, 15.31±0.10°, 15.89±0.10°, 16.53±0.10°, 18.02±0.10°, 19.25±0.10°, 20.93±0.10°, 23.44±0.10°, 23.70±0.10°, 26.16±0.10°, 30.71±0.10° and 32.92±0.10°.

From amongst the peaks of PXRD pattern of the polymorph form A, those at the following 2θ values are the most prominent ones: 10.16±0.10°, 15.31±0.10°, 15.89±0.10°, 16.16±0.10°, 16.53±0.10°, 19.25±0.10°, 20.36±0.10°, 20.93±0.10°, 23.44±0.10°, 23.70±0.10°, 23.92±0.10°, 224.29±0.10°, 26.16±0.10°, 30.71±0.10° and 32.92±0.10°.

When analyzed by differential scanning calorimetry (DSC) form A of the present invention displays a thermogram with a characteristic endothermic peak, also referred to as melting peak. The melting point, determined as the onset of the melting peak, typically lies in the range from about 82° C. to 87° C. The values quoted here relate to values determined by DSC using an aluminum closed cup with a sample size of 1 to 10 mg and applying a heating rate of 10 K/min.

Thermogravimetric analysis, hereinafter also referred to as TGA, revealed that no weight loss occurs on heating, which indicates that form A does not contain solvent.

A $^{13}$C solid state NMR spectrum of form A shows the following resonance peaks against the standard tetramethylsilane (TMS, 1% in CDCl$_3$): 165.3±0.3, 152.7±0.3, 149.9±0.3, 141.9±0.3, 141.1±0.3, 119.7±0.3, 118.9±0.3, 113.8±0.3, 61.2±0.3, 60.4±0.3, 39.8±0.3, 32.9±0.3, 31.9±0.3, 21.4±0.3, 19.4±0.3, 17.9±0.3, 16.3±0.3, 12.8±0.3, 9.4±0.3 and 9.0±0.3 ppm. The resonance peaks reported herein were obtained by recording both the semiquantitative and the quantitative $^{13}$C solid state NMR spectra as described for form B.

The habit and the relative intensities of a quantitative $^{13}$C solid state NMR spectrum are characteristic of form A in that the integral of the resonance peak at 19.4 ppm is 21.2%±2.0%, in particular 21.2%±1.4% and especially 21.2%±1.0% with respect to the total integral of the resonance peaks in the range from 20.4 to 18.6 ppm.

Form A can be obtained by applying the protocols of examples 1 and 2, respectively, of WO 2012/143317 to the preparation of 1-(1,2-dimethylpropyl)-N-ethyl-5-methyl-N-pyridazin-4-yl-pyrazole-4-carboxamide by analogy. Apart from that, form A will form upon evaporation of warm solutions of 1-(1,2-dimethylpropyl)-N-ethyl-5-methyl-N-pyridazin-4-yl-pyrazole-4-carboxamide in methanol, isopropanol, dimethyl formamide, pyridine, N-methylpyrrolidone or 3-methylbutan-2-one.

Just like other forms of 1-(1,2-dimethylpropyl)-N-ethyl-5-methyl-N-pyridazin-4-yl-pyrazole-4-carboxamide known from WO 2012/143317, form B of 1-(1,2-dimethylpropyl)-N-ethyl-5-methyl-N-pyridazin-4-yl-pyrazole-4-carboxamide is suitable for combating or controlling invertebrate pests, in particular arthropode pests and especially insect pests. However, it is superior to this as regards its handling and formulation properties, in particular because of its superior stability against phase change.

Therefore, a further aspect of the present invention relates to the use of the crystalline form B of 1-(1,2-dimethylpropyl)-N-ethyl-5-methyl-N-pyridazin-4-yl-pyrazole-4-carboxamide for the preparation of plant protection formulations containing solid 1-(1,2-dimethylpropyl)-N-ethyl-5-methyl-N-pyridazin-4-yl-pyrazole-4-carboxamide.

The invention thus also relates to plant protection formulations, which contain the crystalline form B and carriers usual for the formulation of plant protection formulations, in particular plant protection formulations in the form of suspensions (e.g. SC, OD, FS), in particular aqueous suspension concentrates (so-called SC or FS) or non-aqueous suspension concentrates (so-called OD), and plant protection agents in the form of wettable powders or dusts (e.g. WP, SP, WS, DP, DS), pressings (e.g. BR, TB, DT), granules (e.g. WG, SG, GR, FG, GG, MG), in particular those granules which are dispersible in water. Plant protection formulations of form B also include gel formulations, in particular for the treatment of plant propagation materials such as seeds (e.g. GF). These and further compositions types are defined in the "Catalogue of pesticide formulation types and international coding system", Technical Monograph No. 2, 6th Ed. May 2008, CropLife International. The plant protection formulations of form B may be prepared in a known manner, such as described by Mollet and Grubemann, Formulation technology, Wiley VCH, Weinheim, 2001; or Knowles, New developments in crop protection product formulation, Agrow Reports DS243, T&F Informa, London, 2005.

The plant protection formulations according to the invention contain form B and one or more carriers customary for the formulation of plant protection formulations. In particular, at least 90% of the 1-(1,2-dimethylpropyl)-N-ethyl-5-methyl-N-pyridazin-4-yl-pyrazole-4-carboxamide contained in such a formulation is present as form B. In such plant protection formulation, the quantity of active substance, i.e. the total quantity of 1-(1,2-dimethylpropyl)-N-ethyl-5-methyl-N-pyridazin-4-yl-pyrazole-4-carboxamide and of other active substances if necessary, normally is in the range from 1 to 98 wt. %, in particular in the range from 2 to 95 wt. %, based on the total weight of the plant protection formulation.

All solid and liquid substances which are normally used as carriers in plant protection formulations, in particular in insecticide formulations are suitable as carriers. Liquid carriers are usually solvents and mixtures of solvents with surfactants. A skilled person will understand that for liquid formulations the liquid carrier will be chosen such that the solubility of 1-(1,2-dimethylpropyl)-N-ethyl-5-methyl-N-pyridazin-4-yl-pyrazole-4-carboxamide in the liquid phase of the formulation is significantly lower than the desired concentration of 1-(1,2-dimethylpropyl)-N-ethyl-5-methyl-N-pyridazin-4-yl-pyrazole-4-carboxamide in the formulation.

Suitable solvents for use in liquid carriers are water and organic solvents and mixtures thereof, wherein 1-(1,2-dimethylpropyl)-N-ethyl-5-methyl-N-pyridazin-4-yl-pyrazole-4-carboxamide has a solubility of at most 40 g/L at 25° C. and 1 bar. However, solvents may also be used, where the solubility of 1-(1,2-dimethylpropyl)-N-ethyl-5-methyl-N-pyridazin-4-yl-pyrazole-4-carboxamide is higher, provided that the solubility of 1-(1,2-dimethylpropyl)-N-ethyl-5-methyl-N-pyridazin-4-yl-pyrazole-4-carboxamide in the liquid phase of the formulation is sufficiently low. Suitable organic solvents for liquid carriers are in particular mineral oil fractions of medium to high boiling point, such as kerosene or diesel oil; oils of vegetable or animal origin; aliphatic and alicyclic hydrocarbons such as hexane, heptane and cyclohexane, and mixtures thereof.

Suitable solid carriers or fillers are mineral earths, e.g. silicates, silica gels, talc, kaolins, lime-stone, lime, chalk, clays, dolomite, diatomaceous earth, bentonite, calcium sulfate, magnesium sulfate, magnesium oxide; polysaccharide powders, e.g. cellulose, starch; fertilizers, e.g. ammonium sulfate, ammonium phosphate, ammonium nitrate, ureas; solid products of vegetable origin, e.g. cereal meal, tree bark meal, wood meal, nutshell meal, and mixtures thereof.

In addition to the carrier, the formulations of the present invention may contain auxiliaries typically used in such formulations. Typical auxiliaries include surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides (preservatives), anti-freezing agents, anti-foaming agents, colorants, tackifiers and binders, and also viscosity-modifying additives (thickeners and rheology modifiers) and means for adjusting the pH, such as buffers.

Suitable surfactants are surface-active compounds, such as anionic, cationic, nonionic and amphoteric surfactants, block polymers, polyelectrolytes, and mixtures thereof. Such surfactants can be used as emusifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sul-fates, phosphates, carboxylates, and mixtures thereof. Examples of sulfonates are alkylaryl-sulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkyl, naphthalenes, sulfosuccinates or sulfosuccinamates. Examples of sulfates are sulfates of fatty acids and oils, of ethoxylated alkylphenols, of alcohols, of ethox-ylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are homo- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines.

Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a neglectable or even no pesticidal activity themselves, and which improve the biological performance of the compounds of the present invention on the target. Examples are surfactants, mineral or vegetable oils, and other auxiliaries. Further examples are listed by Knowles, Adjuvants and additives, Agrow Reports DS256, T&F Informa UK, 2006, chapter 5.

The plant protection formulations according to the invention can also contain one or more additives modifying the viscosity (rheology modifiers). These are understood in particular to mean substances and substance mixtures which impart modified flow behavior to the formulation, for example a high viscosity in the resting state and low viscosity in the moving state. The nature of the rheology modifier is determined by the nature of the formulation. As examples of rheology modifiers, inorganic substances, for example layer silicates and organically modified layer silicates such as bentonites or attapulgites (for example Attaclay®, Engelhardt Co.), and organic substances such as polysaccharides and heteropolysaccharides such as Xanthan Gum® (Kelzan® from Kelco Co.), Rhodopol® 23 (Rhone Poulenc) or Veegum® (R.T. Vanderbilt Co.) should be mentioned.

Suitable bactericides are bronopol and isothiazolinone derivatives such as alkylisothiazolinones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanofer-rate) and organic colorants (e.g. alizarin-, azo- and phthalocyanine colorants).

Examples of antifoaming agents are the silicone emulsions known for this purpose (Silikon® SRE, Wacker Co. or Rhodorsil® from Rhodia Co.), long-chain alcohols, fatty acids and salts thereof, foam suppressants of the aqueous wax dispersion type, solid foam suppressants (so-called Compounds) and organofluorine compounds and mixtures thereof. The quantity of antifoaming agent is typically 0.1 to 1 wt. %, based on the total weight of the plant protection agent.

Suitable tackifiers or binders are polyvinylpyrrolidons, polyvinylacetates, polyvinyl alcohols, polyacrylates, biological or synthetic waxes, and cellulose ethers.

If necessary, the formulations may contain one or more buffers for pH regulation. Examples of buffers are alkali metal salts of weak inorganic or organic acids, such as for example phosphoric acid, boric acid, acetic acid, propionic acid, citric acid, fumaric acid, tartaric acid, oxalic acid and succinic acid.

A preferred group of embodiments of the invention relates to liquid formulations of the form B. In addition to the solid active substance phase, these formulations comprise at least one liquid phase, in which form B is present as dispersed fine particles. As mentioned above, the liquid phase contains at least one of the aforementioned solvents and further auxiliaries, provided that form B is only slightly soluble, or insoluble, therein, for example that the solubility of form B at 25° C. and 1013 mbar in the liquid phase is not more than 20 g/L.

A first preferred embodiment of the invention relates to liquid formulations, wherein the solvent contained in the liquid phase is selected from water and aqueous solvent mixtures, i.e. solvent mixtures which in addition to water also contain one or more organic solvents miscible with water in an amount of up to 20 wt. %, preferably however not more than 10 wt. %, based on the total quantity of water and solvent contained in the liquid phase. Suitable solvents miscible with water are for example ethers miscible with water such as tetrahydrofuran, methyl glycol, methyl diglycol, alkanols such as ethanol or isopropanol or polyols such as glycol, glycerine, diethylene glycol, propylene glycol and the like.

Formulations, wherein the solvent contained in the liquid phase is selected from water and aqueous solvent mixtures, may be formulated as aqueous aqueous suspension concentrates (SCs) or as aqueous gels (GW, GF).

Such aqueous suspension concentrates contain form B in a finely divided particulate form, wherein the particles of the form B is present suspended in an aqueous liquid. The particle size of the active substance particles, i.e. the size which 90 wt. % of the active substance particles do not exceed, here typically lies below 30 µm, in particular below 20 µm. Advantageously, in the SCs according to the invention, at least 40 wt. % and in particular at least 60 wt. % of the particles have diameters below 5 µm.

In such SCs the quantity of active substance, i.e. the total quantity of 1-(1,2-dimethylpropyl)-N-ethyl-5-methyl-N-pyridazin-4-yl-pyrazole-4-carboxamide and of other active substances, if necessary, usually lies in the range from 2 to 60 wt. %, in particular in the range from 5 to 40 wt. %, based on the total weight of the suspension concentrate.

In addition to the active substance, aqueous suspension concentrates typically contain surface-active substances, and they may also contain, if necessary, one or more auxiliaries, selected from antifoaming agents, thickeners (=rheology modifiers), antifreeze agents, biocides and agents for adjusting the pH such as buffers.

Possible surface-active substances are the previously named surfactants. Preferably, the aqueous plant protection formulation of the present invention contains at least one of the previously named anionic surfactants and if necessary one or more nonionic surfactants. The quantity of surfactants will as a rule be 1 to 50 wt. %, in particular 2 to 30 wt. %, based on the total weight of the aqueous SCs according to the invention. Preferably, the surfactant includes at least one anionic surfactant and at least one nonionic surfactant, and the proportion of anionic surfactant to nonionic surfactant typically lies in the range from 10:1 to 1:10.

Concerning the nature and quantity of the antifoaming agents, thickeners, antifreeze agents, buffers and biocides, the same applies as aforesaid.

Aqueous gels (GW, GF) may be similar to the aforementioned suspension concentrates. In contrast to conventional suspension concentrates, the aqueous gels contain a gel-former in such an amount that the formulation is no longer a pourable liquid but a thick gel. Suitable gel formers are e.g. carboxymethylcellulose and superabsorbent polymers.

According to a second preferred embodiment, the solvent contained in the liquid phase is selected from non-aqueous organic solvents in which the solubility of the form B at 25° C. and 1013 mbar is not more than 2 wt. %. These organic solvents include in particular aliphatic and cycloaliphatic hydrocarbons and oils, in particular those of plant origin, and also $C_1$-$C_4$ alkyl esters of saturated or unsaturated fatty acids or fatty acid mixtures, in particular the methyl esters, for example methyl oleate, methyl stearate and rape oil methyl ester, but also paraffinic mineral oils and the like. Accordingly, the present invention relates also to formulations for plant protection in the form of a non-aqueous suspension concentrate, which will also be referred to below as OD (oil-dispersion).

Such non-aqueous suspension concentrates contain the form B of 1-(1,2-dimethylpropyl)-N-ethyl-5-methyl-N-pyridazin-4-yl-pyrazole-4-carboxamide in a finely divided particulate form, wherein the particles of the form B are present suspended in a non-aqueous phase. The size of the active substance particles, i.e. the size which 90 wt. % of the active substance particles do not exceed, here typically lies below 30 µm, in particular below 20 µm. Advantageously, in the non-aqueous suspension concentrates, at least 40 wt. % and in particular at least 60 wt. % of the particles have diameters below 10 µm.

In such ODs, the quantity of active substance, i.e. the total quantity of 1-(1,2-dimethylpropyl)-N-ethyl-5-methyl-N-pyridazin-4-yl-pyrazole-4-carboxamide and of other active substances, if present, usually is in the range from 1 to 60 wt. %, in particular in the range from 5 to 50 wt. %, based on the total weight of the non-aqueous suspension concentrate.

In addition to 1-(1,2-dimethylpropyl)-N-ethyl-5-methyl-N-pyridazin-4-yl-pyrazole-4-carboxamide and the liquid carrier, non-aqueous suspension concentrates typically contain surface-active substances, and also if necessary antifoaming agents, agents to modify the rheology and stabilizers (biocides).

Possible surface-active substances are preferably the previously named anionic and nonionic surfactants. The quantity of surface-active substances will as a rule be 1 to 30 wt. %, in particular 2 to 20 wt. %, based on the total weight of the non-aqueous SCs according to the invention. Preferably, the surface-active substances include at least one anionic surface-active substance and at least one nonionic surface-active substance, and the proportion of anionic to nonionic surface-active substance typically lies in the range from 10:1 to 1:10.

The crystalline form B of the invention can also be formulated as solid plant protection formulations. These formulations include powders, scattering and dusting agents, but also water-dispersible powders and granules, for example coated, impregnated and homogenous granules. Such formulations can be produced by mixing or simultaneous grinding of the form B with a solid carrier and if necessary other additives, in particular surface-active substances. Granules can be produced by binding of the active substances to solid carriers. Solid carriers are mineral earths such as silicic acids, silica gels, silicates, talc, kaolin, limestone, lime, chalk, bole, loess, clay, dolomite, diatomaceous earth, calcium and magnesium sulfate, magnesium oxide, ground plastics, fertilizers such as ammonium sulfate, ammonium phosphate, ammonium nitrate, ureas and plant products such as cereal flour, tree bark, wood and nutshell flour, cellulose powder or other solid carriers. Solid formulations can also be produced by spray drying, if necessary in the presence of polymeric or inorganic drying aids, and if necessary in the presence of solid carriers. For the production of solid formulations of form B, extrusion processes, fluidized bed granulation, spray granulation and comparable technologies are suitable.

Possible surface-active substances are the previously named surfactants and protective colloids. The quantity of surface-active substances will as a rule be 1 to 30 wt. %, in particular 2 to 20 wt. %, based on the total weight of the solid formulation according to the invention.

In such solid formulations, the quantity of active substance, i.e. the total quantity of tembotrione and of other active substances if necessary, usually lies in the range from 10 to 70 wt. %, in particular in the range from 20 to 50 wt. %, based on the total weight of the solid formulation.

The following formulation recipes illustrate the production of such formulations of form B:

I. Water-dispersible powders (WP, SP):
  50 to 80 wt. % of crystalline form B according to the invention are ground in a rotor-stator mill with addition of 1 to 5 wt. % dispersants, e.g. sodium lignosulfonate, 1 to 3 wt. % wetting agents, e.g. alcohol ethoxylate, and up to 100 wt. % solid carrier, e.g. silica gel. Dilution with water gives a stable dispersion of the form B.

II. Dustable powder (DP, DS)

1 to 10 wt. % of the form B are mixed with are ground finely and mixed intimately with up to 100 wt. % solid carrier, e.g. finely divided kaolin. In this manner, a dusting agent which contains 1 to 10 wt. % of the form B is obtained.

III. Non-aqueous suspension concentrates (OD):

In an agitated ball mill, 20 to 60 wt. % of form B according to the invention are comminuted with addition of 2 to 15 wt. % dispersants and wetting agents, e.g. calcium salt of dodecylbenzenesulfonic and alcohol ethoxylate and optionally the sodium salt of a phenolsulfonic acid urea formaldehyde condensate, and up to 100 wt. % of a paraffinic mineral oil. A stable, non-aqueous suspension concentrate of the form B is obtained. On dilution in water, a stable suspension of the form B is obtained.

IV. Aqueous suspension concentrate (SC, FS):

In an agitated ball mill, 20 to 60 wt. % of form B according to the invention are comminuted with addition of 2 to 10 wt. % dispersants and wetting agents, e.g. sodium lignosulfonate, castor oil ethoxylate and/or alcohol ethoxylate, 0.1 to 2 wt. % thickener, e.g. xanthan gum, optionally further additives such as anti settling agents, microbiocides and/or and defoamars, and up to 100 wt. % water to give a fine active substance suspension, which is stable upon storage. Dilution with water gives a stable suspension of the form B. For FS type composition up to 40 wt. % of a binder (e.g. polyvinylalcohol) is added.

V. Water-dispersible and water-soluble granules (GR, FG)

0.1 to 30 wt. % of crystalline form B is ground finely and combined with up to 100 wt. % solid carrier, e.g. silicate, in a granulator. Granulation may be achieved e.g. by compaction, such as extrusion, or by agglomeration, such as spray-drying or fluidized bed granulation.

VI. Aqueous Gel formulations (GW, GF):

In an agitated ball mill, 5 to 25 wt. % form B are comminuted with addition of 3 to 10 wt. % dispersants, e.g. sodium lignosulfonate, 1 to 5 wt. % thickener, e.g. carboxymethylcellulose, and up to 100 wt. % water to give a fine suspension of form B in the gelled aqueous phase. Dilution of the gel with water gives a stable suspension of form B.

The formulations of the present invention may contain the form B of the invention as the sole active ingredient. However, instead of form B, a combination of form B and one or more further agriculturally active compounds, such as herbicides, insecticides, fungicides, growth regulators, safeners etc.

The application of the form B or the formulation containing form B is effected, if the formulation is not already ready for use, in the form of aqueous spray liquors. These aqueous spray liquors are prepared by dilution of the aforesaid formulations containing the form B with water, thereby an aqueous spray liquor, which contains the crystalline form B. These spray liquors are also part of the present invention. The spray liquors can also contain other components in dissolved, emulsified or suspended form, for oils, wetters, adjuvants, fertilizer, or micronutrients, and other active compounds, e.g. herbicides, insecticides, fungicides, growth regulators, safeners). These agents can be contained in the formulation or they may admixed with the formulations according to the invention prior to the application, e.g. in a weight ratio of 1:100 to 100:1. As a rule, these components are added to the spray liquor before, during or after the dilution of the formulations according to the invention.

The user applies the formulation of the invention usually from a predosage device, a knapsack sprayer, a spray tank, a spray plane, or an irrigation system. Usually, the formulations of form B are made up with water, buffer, and/or further auxiliaries to the desired application concentration. Usually, 20 to 2000 liters, preferably 50 to 400 liters, of the ready-to-use spray liquor are applied per hectare of agricultural useful area.

As stated above, the crystalline form B of 1-(1,2-dimethylpropyl)-N-ethyl-5-methyl-N-pyridazin-4-yl-pyrazole-4-carboxamide and the formulations containing it, are suitable for combating or controlling invertebrate pests, in particular arthropode pests and especially insect pests. Therefore, the present invention also relates to a method of combating or controlling invertebrate pests, which comprises contacting the invertebrate pests, their food supply, including crops, plants and plant propagation materials, such as seeds, or their habitat or breeding ground, i.e. the area, material or environment, such as soil or water, in which the invertebrate pests are growing or may grow, with the crystalline form B of the present invention.

Therefore, the crystalline form B and the formulation containing it are likewise suitable for use in protecting crops, growing plants and plant propagation materials, such as seeds, from attack or infestation by invertebrate pests, such as insects. Therefore, the present invention also relates to a plant protection method, which comprises contacting crops, growing plants, plant propagation materials, such as seeds, or soil or water, in which the plants are growing, to be protected from attack or infestation by invertebrate pests, with the crystalline form B of the present invention.

For further details in this regard, we refer to WO 2012/143317.

The crystalline form B of the present invention is effective through both contact and ingestion. Furthermore, the crystalline form B can be applied to multiple developmental stages, such as egg, larva, pupa, and adult.

As explained above, the crystalline form B of the present invention can be applied as such or in form of formulations or as aqueous spray liquors containing form B as described above. Furthermore, the crystalline form B and the formulations of the present invention can be applied together with a mixing partner which is unusually another pesticide or an adjuvant or in form of compositions comprising said mixtures as defined above. The components of said mixture can be applied simultaneously, jointly or separately, or in succession, that is immediately one after another and thereby creating the mixture "in situ" on the desired location, e.g. the plant, the sequence, in the case of separate application, generally not having any effect on the result of the control measures.

The application can be carried out both before and after the infestation of the crops, plants, plant propagation materials, such as seeds, soil, or the area, material or environment by the pests.

Suitable application methods include inter alia soil treatment, seed treatment, in furrow application, and foliar application. Soil treatment methods include drenching the soil, drip irrigation (drip application onto the soil), dipping roots, tubers or bulbs, or soil injection. Seed treatment techniques include seed dressing, seed coating, seed dusting, seed soaking, and seed pelleting. In furrow applications typically include the steps of making a furrow in cultivated land, seeding the furrow with seeds, applying the pesticidally active compound to the furrow, and closing the furrow. Foliar application refers to the application of the form B or a formulation containing it to plant foliage, e.g. through spray equipment. For foliar applications, it can be advantageous to modify the behavior of the pests by use of pheromones in combination with the compounds of the present invention. Suitable pheromones for specific crops and pests are known to a skilled person and publicly available from databases of pheromones and semiochemicals, such as http://www.pherobase.com.

As used herein, the term "contacting" includes both direct contact (applying the form B/formulation directly on the invertebrate pest or plant—typically to the foliage, stem or roots of the plant) and indirect contact (applying the form B/formulation to the locus, i.e. habitat, breeding ground, plant, seed, soil, area, material or environment in which a pest is growing or may grow, of the invertebrate pest or plant).

The term "invertebrate pest" includes arthropods, gastropods, and nematodes. Preferred invertebrate pests according to the invention are arthropods, preferably insects and arachnids, in particular insects. Insects, which are of particular relevance for crops, are typically referred to as crop insect pests.

The term "crop" refers to both, growing and harvested crops.

The form B of the invention and the formulation containing form B are especially suitable for efficiently combating animal pests such as arthropods, gastropods and nematodes including but not limited to:

insects of the order of Lepidoptera, for example *Achroia grisella, Acleris* spp. such as *A. fimbriana, A. gloverana, A. variana; Acrolepiopsis assectella, Acronicta major, Adoxophyes* spp. such as *A. cyrtosema, A. orana; Aedia leucomelas, Agrotis* spp. such as *A. exclamationis, A. fucosa, A. ipsilon, A. orthogoma, A. segetum, A. subterranea; Alabama argillacea, Aleurodicus dispersus, Alsophila pometaria, Ampelophaga rubiginosa, Amyelois transitella, Anacampsis sarcitella, Anagasta kuehniella, Anarsia lineatella, Anisota senatoria, Antheraea pernyi, Anticarsia (=Thermesia)* spp. such as *A. gemmatalis; Apamea* spp., *Aproaerema modicella, Archips* spp. such as *A. argyrospila, A. fuscocupreanus, A. rosana, A. xyloseanus; Argyresthia conjugella, Argyroploce* spp., *Argyrotaenia* spp. such as *A. velutinana; Athetis mindara, Austroasca viridigrsea, Autographa gamma, Autographa nignrsigna, Barathra brassicae, Bedellia* spp., *Bonagota salubricola, Borbo cinnara, Bucculatrix thurberiella, Bupalus piniarius, Busseola* spp., *Cacoecia* spp. such as *C. murinana, C. podana; Cactoblastis cactorum, Cadra cautella, Calingo braziliensis, Caloptilis theivora, Capua reticulana, Carposina* spp. such as *C. niponensis, C. sasakii; Cephus* spp., *Chaetocnema aridula, Cheimatobia brumata, Chilo* spp. such as *C. Indicus, C. suppressalis, C. partellus; Choreutis pariana, Choristoneura* spp. such as *C. conflictana, C. fumiferana, C. longicellana, C. murinana, C. occidentalis, C. rosaceana; Chrysodeixis (=Pseudoplusia)* spp. such as *C. eriosoma, C. includens; Cirphis unipuncta, Clysia ambiguella, Cnaphalocerus* spp., *Cnaphalocrocis medinalis, Cnephasia* spp., *Cochylis hospes, Coleophora* spp., *Colias eurytheme, Conopomorpha* spp., *Conotrachelus* spp., *Copitarsia* spp., *Corcyra cephalonica, Crambus caliginosellus, Crambus teterrellus, Crocidosema (=Epinotia) aporema, Cydalima (=Diaphania) perspectalis, Cydia (=Carpocapsa)* spp. such as *C. pomonella, C. latiferreana; Dalaca noctuides, Datana integerrima, Dasychira pinicola, Dendrolimus* spp. such as *D. pini, D. spectabilis, D. sibiricus; Desmia funeralis, Diaphania* spp. such as *D. nitidalis, D. hyalinata, Diatraea grandiosella, Diatraea saccharalis, Diphthera festiva, Earias* spp. such as *E. insulana, E. vittella; Ecdytolopha aurantianu, Egira (=Xylomyges) curialis, Elasmopalpus lignosellus, Eldana saccharina, Endopiza viteana, Ennomos subsignaria, Eoreuma loftini, Ephestia* spp. such as *E. cautella, E. elutella, E. kuehniella, Epinotia aporema, Epiphyas postvittana, Erannis tiliaria, Erionota thrax, Etiella* spp., *Eulia* spp., *Eupoecilia ambiguella, Euproctis chrysorrhoea, Euxoa* spp., *Evetria bouliana, Faronta albilinea, Feltia* spp. such as *F. subterranean; Galleria mellonella, Gracillaria* spp., *Grapholita* spp. such as *G. funebrana, G. molesta, G. inopinata; Halysidota* spp., *Harrisina americana, Hedylepta* spp., *Helicoverpa* spp. such as *H. armigera (=Heliothis armigera), H. zea (=Heliothis zea); Heliothis* spp. such as *H. assulta, H. subflexa, H. virescens; Hellula* spp. such as *H. undalis, H. rogatalis; Helocoverpa gelotopoeon, Hemileuca oliviae, Herpetogramma licarsisalis, Hibernia defoliaria, Hofmannophila pseudospretella, Homoeosoma electellum, Homona magnanima, Hypena scabra, Hyphantria cunea, Hyponomeuta padella, Hyponomeuta malinellus, Kakivoria flavofasciata, Keiferia lycopersicella, Lambdina fiscellaria fiscellaria, Lambdina fiscellaria lugubrosa, Lamprosema indicata, Laspeyresia molesta, Leguminivora glycinivorella, Lerodea eufala, Leucinodes orbonalis, Leucoma salicis, Leucoptera* spp. such as *L. coffeella, L. scitella; Leuminivora lycinivorella, Lithocolletis blancardella, Lithophane antennata, Llattia octo (=Amyna axis), Lobesia botrana, Lophocampa* spp., *Loxagrotis albicosta, Loxostege* spp. such as *L. sticticalis, L. cereralis; Lymantria* spp. such as *L. dispar, L. monacha; Lyonetia clerkella, Lyonetia prunifoliella, Malacosoma* spp. such as *M. americanum, M. californicum, M. constrictum, M. neustria; Mamestra* spp. such as *M. brassicae, M. configurata; Mamstra brassicae, Manduca* spp. such as *M. quinquemaculata, M. sexta; Marasmia* spp, *Marmara* spp., *Maruca testulalis, Megalopyge lanata, Melanchra picta, Melanitis leda, Mocis* spp. such as *M. lapites, M. repanda; Mocis latipes, Monochroa fragariae, Mythimna separata, Nemapogon cloacella, Neoleucinodes elegantalis, Nepytia* spp., *Nymphula* spp., *Oiketicus* spp., *Omiodes indicata, Omphisa anastomosalis, Operophtera brumata, Orgyia pseudotsugata, Oria* spp., *Orthaga thyrisalis, Ostrinia* spp. such as *O. nubilalis; Oulema oryzae, Paleacrita vernata, Panolis flammea, Parnara* spp., *Papaipema nebris, Papilio cresphontes, Paramyelois transitella, Paranthrene regalis, Paysandisia archon, Pectinophora* spp. such as *P. gossypiella; Peridroma saucia, Perileucoptera* spp., such as *P. coffeella; Phalera bucephala, Phryganidia californica, Phthorimaea* spp. such as *P. operculella; Phyllocnistis citrella, Phyllonorycterspp.* such as *P. blancardella, P. crataegella, P. issikii, P. ringoniella; Piers* spp. such as *P. brassicae, P. rapae, P. napi; Pilocrocis tripunctata, Plathypena scabra, Platynota* spp. such as *P. flavedana, P. idaeusalis, P. stultana; Platyptilia carduidactyla, Plebejus argus, Plodia interpunctella, Plusia* spp, *Plutella maculipennis, Plutella xylostella, Pontia protodica, Prays* spp., *Prodenia* spp., *Proxenus lepigone, Pseudaletia* spp. such as *P. sequax, P. unipuncta; Pyrausta nubilalis, Rachiplusia nu, Richia albicosta, Rhizobius ventralis, Rhyacionia frustrana, Sabulodes aegrotata, Schizura concinna, Schoenobius* spp., *Schreckensteinia festaliella, Scirpophaga* spp. such as *S. incertulas, S. innotata; Scotia segetum, Sesamia* spp. such as *S. inferens, Seudyra subflava, Sitotroga cerealella, Sparganothis pillerana, Spilonota lechriaspis, S. ocellana, Spodoptera (=Lamphygma)* spp. such as *S. cosmoides, S. eridania, S.*

*exigua, S. frugiperda, S. latisfascia, S. littoralis, S. litura, S. omithogalli; Stigmella* spp., *Stomopteryx subsecivella, Strymon bazochii, Sylepta derogata, Synanthedon* spp. such as *S. exitiosa, Tecia solanivora, Telehin licus, Thaumatopoea pityocampa, Thaumatotibia (=Cryptophlebia) leucotreta, Thaumatopoea pityocampa, Thecla* spp., *Theresimima ampelophaga, Thyrinteina* spp, *Tildenia inconspicuella, Tinea* spp. such as *T. cloacella, T. pellionella; Tineola bisselliella, Tortrixspp.* such as *T. viridana; Trichophaga tapetzella, Trichoplusia* spp. such as *T. ni; Tuta (=Scrobipalpula) absoluta, Udea* spp. such as *U. rubigalis, U. rubigalis; Virachola* spp., *Yponomeuta padella,* and *Zeiraphera canadensis;* insects of the order of Coleoptera, for example *Acalymma vittatum, Acanthoscehdes obtectus, Adoretus* spp., *Agelastica alni, Agrilus* spp. such as *A. anxius, A. planipennis, A. sinuatus; Agriotes* spp. such as *A. fuscicollis, A. lineatus, A. obscurus; Alphitobius diaperinus, Amphimallus solstitialis, Anisandrus dispar, Anisoplia austriaca, Anobium punctatum, Anomala corpulenta, Anomala rufocuprea, Anoplophora* spp. such as *A. glabripennis; Anthonomus* spp. such as *A. eugenii, A. grandis, A. pomorum; Anthrenus* spp., *Aphthona euphoridae, Apion* spp., *Apogonia* spp., *Athous haemorrhoidalis, Atomara* spp. such as *A. linears; Attagenus* spp., *Aulacophora femoralis, Blastophagus piniperda, Blitophaga undata, Bruchidius obtectus, Bruchus* spp. such as *B. lentis, B. pisorum, B. rufimanus; Byctiscus betulae, Callidiellum rufipenne, Callopistria floridensis, Callosobruchus chinensis, Camerarna ohridella, Cassida nebulosa, Cerotoma trifurcata, Cetonia aurata, Ceuthorhynchus* spp. such as *C. assimilis, C. napi; Chaetocnema tibialis, Cleonus mendicus, Conoderus* spp. such as *C. vespertinus; Conotrachelus nenuphar, Cosmopolites* spp., *Costelytra zealandica, Crioceris asparagi, Cryptolestes ferrugineus, Cryptorhynchus lapathi, Ctenicera* spp. such as *C. destructor; Curculio* spp., *Cylindrocopturus* spp., *Cyclo-cephala* spp., *Dactylispa balyi, Dectes texanus, Dermestes* spp., *Diabrotica* spp. such as *D. undecimpunctata, D. speciosa, D. longicornis, D. semipunctata, D. virgifera; Diaprepes abbreviates, Dichocrocis* spp., *Dicladispa armigera, Diloboderus abderus, Diocalandra frumenti (Diocalandra stigmaticollis), Enaphalodes rufulus, Epilachna* spp. such as *E. varivestis, E. vigintioctomaculata; Epitrixspp.* such as *E. hirtipennis, E. similars; Eutheola humilis, Eutinobothrus brasiliensis, Faustinus cubae, Gibbium psylloides, Gnathocerus cornutus, Hellula undalis, Heteronychus arator, Hylamorpha elegans, Hylobius abietis, Hylotrupes bajulus, Hypera* spp. such as *H. brunneipennis, H. postica; Hypomeces squamosus, Hypothenemus* spp., *Ips typographus, Lachnosterna consanguinea, Lasioderma serricorne, Latheticus oryzae, Lathridius* spp., *Lema* spp. such as *L. bilineata, L. melanopus; Leptinotarsa* spp. such as *L. decemlineata; Leptispa pygmaea, Limonius californicus, Lissorhoptrus oryzophilus, Lixus* spp., *Luperodes* spp., *Lyctus* spp. such as *L. bruneus; Liogenys fuscus, Macrodactylus* spp. such as *M. subspinosus; Maladera matrida, Megaplatypus mutates, Megascelis* spp., *Melanotus communis, Meligethes* spp. such as *M. aeneus; Melolontha* spp. such as *M. hippocastani, M. melolontha; Metamasius hemipterus, Microtheca* spp., *Migdolus* spp. such as *M. fryanus, Monochamus* spp. such as *M. alternatus; Naupactus xanthographus, Niptus hololeucus, Oberia brevis, Oemona hirta, Oryctes rhinoceros, Oryzaephilus surinamensis, Oryzaphagus oryzae, Otiorrhynchus sulcatus, Otiorrhynchus ovatus, Otiorrhynchus sulcatus, Oulema melanopus, Oulema oryzae, Oxycetonia jucunda, Phaedon* spp. such as *P. brassicae, P. cochleariae; Phoracantha recurva, Phyllobius pyri, Phyllopertha horticola, Phyllophaga* spp. such as *P. helleri; Phyllotreta* spp. such as *P. chrysocephala, P. nemorum, P. striolata, P. vittula; Phyllopertha horticola, Popillia japonica, Premnotrypes* spp., *Psacothea hilars, Psylliodes chrysocephala, Prostephanus truncates, Psylliodes* spp., *Ptinus* spp., *Pulga saltona, Rhizopertha dominica, Rhynchophorus* spp. such as *R. billineatus, R. ferrugineus, R. palmarum, R. phoenicis, R. vulneratus; Saperda candida, Scolytus schevyrewi, Scyphophorus acupunctatus, Sitona lineatus, Sitophilus* spp. such as *S. granaria, S. oryzae, S. zeamais; Sphenophorus* spp. such as *S. levis; Stegobium paniceum, Sternechus* spp. such as *S. subsignatus; Strophomorphus ctenotus, Symphyletes* spp., *Tanymecus* spp., *Tenebrio molitor, Tenebrioides mauretanicus, Tribolium* spp. such as *T. castaneum; Trogoderma* spp., *Tychius* spp., *Xylotrechus* spp. such as *X. pyrrhoderus;* and, *Zabrus* spp. such as *Z. tenebrioides;* insects of the order of Diptera e.g. *Aedes* spp. such as *A. aegypti, A. albopictus, A. vexans; Anastrepha ludens, Anopheles* spp. such as *A. albimanus, A. crucians, A. freeborni, A. gambiae, A. leucosphyrus, A. maculipennis, A. minimus, A. quadrimaculatus, A. sinensis; Bactrocera invadens, Bibio hortulanus, Calliphora erythrocephala, Calliphora vicina, Ceratitis capitata, Chrysomyia* spp. such as *C. bezziana, C. hominivorax, C. macellaria; Chrysops atlanticus, Chrysops discalis, Chrysops silacea, Cochliomyia* spp. such as *C. hominivorax; Contarinia* spp. such as *C. sorghicola; Cordylobia anthropophaga, Culexspp.* such as *C. nigripalpus, C. pipiens, C. quinquefasciatus, C. tarsalis, C. tritaeniorhynchus; Culicoides furens, Culiseta inornata, Culiseta melanura, Cuterebra* spp., *Dacus cucurbitae, Dacus oleae, Dasineura brassicae, Dasineura oxycoccana, Delia* spp. such as *D. antique, D. coarctata, D. platura, D. radicum; Dermatobia hominis, Drosophila* spp. such as *D. suzukii, Fannia* spp. such as *F. canicularns; Gastraphilus* spp. such as *G. intestinalis; Geomyza tipunctata, Glossina* spp. such as *G. fuscipes, G. morsitans, G. palpalis, G. tachinoides; Haematobia irritans, Haplodiplosis equestris, Hippelates* spp., *Hylemyia* spp. such as *H. platura; Hypoderma* spp. such as *H. lineata; Hyppobosca* spp., *Hydrellia philippina, Leptoconops torrens, Liriomyza* spp. such as *L. sativae, L. trifolii; Lucilia* spp. such as *L. caprina, L. cuprina, L. sericata; Lycoria pectoralis, Mansonia titillanus, Mayetiola* spp. such as *M. destructor; Musca* spp. such as *M. autumnalis, M. domestica; Muscina stabulans, Oestrus* spp. such as *O. ovis; Opomyza florum, Oscinella* spp. such as *O. frit; Orseolia oryzae, Pegomya hysocyami, Phlebotomus argentipes, Phorbia* spp. such as *P. antiqua, P. brassicae, P. coarctata; Phytomyza gymnostoma, Prosimulium mixtum, Psila rosae, Psorophora columbiae, Psorophora discolor, Rhagoletis* spp. such as *R. cerasi, R. cingulate, R. indifferens, R. mendax, R. pomonella; Rivellia quadrifasciata, Sarcophaga* spp. such as *S. haemorrhoidalis; Simulium vittatum, Sitodiplosis mosellana, Stomoxys* spp. such as *S. calcitrans; Tabanus* spp. such as *T. atratus, T. bovinus, T. lineola, T. similis; Tannia* spp., *Thecodiplosis japonensis, Tipula oleracea, Tipula paludosa,* and *Wohlfahrtia* spp;

insects of the order of Thysanoptera for example, *Baliothrips biformis, Dichromothrips corbetti, Dichromothrips* ssp., *Echinothrips americanus, Enneothrips flavens, Frankliniella* spp. such as *F. fusca, F. occidentalis, F. tritici; Heliothrips* spp., *Hercinothrips femoralis, Kakothrips* spp., *Microcephalothrips abdominalis, Neohydatothnps samayunkur, Pezothnps kellyanus, Rhipiphorothrips cruentatus, Scirtothrips* spp. such as *S. citri, S. dorsalis, S. perseae; Stenchaetothrips* spp, *Taeniothrips cardamoni, Taeniothrips*

*inconsequens*, *Thrips* spp. such as *T. imagines*, *T. hawaiiensis*, *T. oryzae*, *T. palmi*, *T. parvispinus*, *T. tabaci*;

insects of the order of Hemiptera for example, *Acizzia jamatonica*, *Acrosternum* spp. such as *A. hilare*; *Acyrthosipon* spp. such as *A. onobrychis*, *A. pisum*; *Adelges laricis*, *Adelges tsugae*, *Adelphocoris* spp., such as *A. rapidus*, *A. superbus*; *Aeneolamia* spp., *Agonoscena* spp., *Aulacorthum solani*, *Aleurocanthus woglumi*, *Aleurodes* spp., *Aleurodicus disperses*, *Aleurolobus barodensis*, *Aleurothrixus* spp., *Amrasca* spp., *Anasa tristis*, *Antestiopsis* spp., *Anuraphis cardui*, *Aonidiella* spp., *Aphanostigma piri*, *Aphidula nasturtii*, *Aphis* spp. such as *A. craccivora*, *A. fabae*, *A. forbesi*, *A. gossypii*, *A. grossulariae*, *A. maidiradicis*, *A. pomi*, *A. sambuci*, *A. schneideri*, *A. spiraecola*; *Arboridia apicalis*, *Arilus critatus*, *Aspidiella* spp., *Aspidiotus* spp., *Atanus* spp., *Aulacaspis yasumatsui*, *Aulacorthum solani*, *Bactericera cockerelli* (*Paratrioza cockerelli*), *Bemisia* spp. such as *B. argentifolii*, *B. tabaci* (*Aleurodes tabaci*); *Blissus* spp. such as *B. leucopterus*; *Brachycaudus* spp. such as *B. cardui*, *B. helichrysi*, *B. persicae*, *B. prunicola*; *Brachycolus* spp., *Brachycorynella asparagi*, *Brevicoryne brassicae*, *Cacopsylla* spp. such as *C. fulguralis*, *C. pyricola* (*Psylla pin*); *Calligypona marginata*, *Calocoris* spp., *Campylomma livida*, *Capitophorus horni*, *Carneocephala fulgida*, *Cavelerius* spp., *Ceraplastes* spp., *Ceratovacuna lanigera*, *Ceroplastes ceriferus*, *Cerosipha gossypii*, *Chaetosiphon fragaefolii*, *Chionaspis tegalensis*, *Chlorita onukii*, *Chromaphis juglandicola*, *Chrysomphalus ficus*, *Cicadulina mbila*, *Cimex*spp. such as *C. hemipterus*, *C. lectularius*; *Coccomytilus halli*, *Coccus* spp. such as *C. hesperidum*, *C. pseudomagnoliarum*; *Corythucha arcuata*, *Creontiades dilutus*, *Cryptomyzus ribis*, *Chrysomphalus aonidum*, *Cryptomyzus ribis*, *Ctenarytaina spatulata*, *Cyrtopeltis notatus*, *Dalbulus* spp., *Dasynus piperis*, *Dialeurodes* spp. such as *D. citrifolii*; *Dalbulus maidis*, *Diaphorina* spp. such as *D. citri*; *Diaspis* spp. such as *D. bromeliae*; *Dichelops furcatus*, *Diconocoris hewetti*, *Doralis* spp., *Dreyfusia nordmannianae*, *Dreyfusia piceae*, *Drosicha* spp., *Dysaphis* spp. such as *D. plantaginea*, *D. pyri*, *D. radicola*; *Dysaulacorthum pseudosolani*, *Dysdercus* spp. such as *D. cingulatus*, *D. intermedius*; *Dysmicoccus* spp., *Edessa* spp., *Geocoris* spp., *Empoasca* spp. such as *E. fabae*, *E. solana*; *Epidiaspis leperii*, *Eriosoma* spp. such as *E. lanigerum*, *E. pyricola*; *Erythroneura* spp., *Eurygaster* spp. such as *E. integriceps*; *Euscelis bilobatus*, *Euschistus* spp. such as *E. heros*, *E. impictiventris*, *E. servus*; *Fiorinia theae*, *Geococcus coffeae*, *Glycaspis brimblecombei*, *Halyomorpha* spp. such as *H. halys*; *Heliopeltis* spp., *Homalodisca vitripennis* (=*H. coagulata*), *Horcias nobilellus*, *Hyalopterus prun*, *Hyperomyzus lactucae*, *Icerya* spp. such as *I. purchase*; *Idiocerus* spp., *Idioscopus* spp., *Laodelphax striatellus*, *Lecanium* spp., *Lecanoideus floccissimus*, *Lepidosaphes* spp. such as *L. ulmi*; *Leptocorisa* spp., *Leptoglossus phyllopus*, *Lipaphis erysimi*, *Lygus* spp. such as *L. hesperus*, *L. lineolaris*, *L. pratensis*; *Maconellicoccus hirsutus*, *Marchalina hellenica*, *Macropes excavatus*, *Macrosiphum* spp. such as *M. rosae*, *M. avenae*, *M. euphorbiae*; *Macrosteles quadrilineatus*, *Mahanarva fimbriolata*, *Megacopta cribraria*, *Megoura viciae*, *Melanaphis pyrarius*, *Melanaphis sacchari*, *Melanocallis* (=*Tinocallis*) *caryaefoliae*, *Metcafiella* spp., *Metopolophium dirhodum*, *Monellia costalis*, *Monelliopsis pecanms*, *Myzocallis coryli*, *Murgantia* spp., *Myzus* spp. such as *M. ascalonicus*, *M. cerasi*, *M. nicotianae*, *M. persicae*, *M. varians*; *Nasonovia ribis-nigri*, *Neotoxoptera formosana*, *Neomegalotomus* spp, *Nephotettix* spp. such as *N. malayanus*, *N. nigropictus*, *N. parvus*, *N. virescens*; *Nezara* spp. such as *N. viridula*; *Nilaparvata lugens*, *Nysius huttoni*, *Oebalus* spp. such as *O. pugnax*; *Oncometopia* spp., *Orthezia praelonga*, *Oxycaraenus hyalinipennis*, *Parabemisia myricae*, *Parlatoria* spp., *Parthenolecanium* spp. such as *P. corni*, *P. persicae*; *Pemphigus* spp. such as *P. bursarius*, *P. populivenae*; *Peregrinus maidis*, *Perkinsiella saccharicida*, *Phenacoccus* spp. such as *P. aceris*, *P. gossypii*; *Phloeomyzus passerinii*, *Phorodon humuli*, *Phylloxera* spp. such as *P. devastatrix*, *Piesma quadrata*, *Piezodorus* spp. such as *P. guildinii*; *Pinnaspis aspidistrae*, *Planococcus* spp. such as *P. citri*, *P. ficus*; *Prosapia bicincta*, *Protopulvinaria pyriformis*, *Psallus seriatus*, *Pseudacysta persea*, *Pseudaulacaspis pentagona*, *Pseudococcus* spp. such as *P. comstocki*; *Psylla* spp. such as *P. mali*; *Pteromalus* spp., *Pulvinaria amygdali*, *Pyrilla* spp., *Quadraspidiotus* spp., such as *Q. perniciosus*; *Quesada gigas*, *Rastrococcus* spp., *Reduvius senilis*, *Rhizoecus americanus*, *Rhodnius* spp., *Rhopalomyzus ascalonicus*, *Rhopalosiphum* spp. such as *R. pseudobrassicas*, *R. insertum*, *R. maidis*, *R. padi*; *Sagatodes* spp., *Sahlbergella singularis*, *Saissetia* spp., *Sappaphis mala*, *Sappaphis mali*, *Scaptocoris* spp., *Scaphoides titanus*, *Schizaphis graminum*, *Schizoneura lanuginosa*, *Scotinophora* spp., *Selenaspidus articulatus*, *Sitobion avenae*, *Sogata* spp., *Sogatella furcifera*, *Solubea insularis*, *Spissistilus festinus* (=*Stictocephala festina*), *Stephanitis nashi*, *Stephanitis pyrioides*, *Stephanitis takeyai*, *Tenalaphara malayensis*, *Tetraleurodes perseae*, *Therioaphis maculate*, *Thyanta* spp. such as *T. accerra*, *T. perditor*; *Tibraca* spp., *Tomaspis* spp., *Toxoptera* spp. such as *T. aurantii*; *Trialeurodes* spp. such as *T. abutilonea*, *T. ricini*, *T. vaporariorum*; *Triatoma* spp., *Trioza* spp., *Typhlocyba* spp., *Unaspis* spp. such as *U. citri*, *U. yanonensis*; and *Viteus vitifolii*, Insects of the order Hymenoptera for example *Acanthomyops interjectus*, *Athalia rosae*, *Atta* spp. such as *A. capiguara*, *A. cephalotes*, *A. cephalotes*, *A. Jaevigata*, *A. robusta*, *A. sexdens*, *A. texana*, *Bombus* spp., *Brachymyrmex* spp., *Camponotus* spp. such as *C. floridanus*, *C. pennsylvanicus*, *C. modoc*; *Cardiocondylanuda*, *Chalibion* sp, *Crematogasterspp.*, *Dasymutilla occidentalis*, *Diprion* spp., *Dolichovespula maculata*, *Dorymyrmexspp.*, *Dryocosmus kuriphilus*, *Formica* spp., *Hoplocampa* spp. such as *H. minuta*, *H. testudinea*; *Iridomyrmexhumilis*, *Lasius* spp. such as *L. niger*, *Linepithema humile*, *Liometopum* spp., *Leptocybe invasa*, *Monomorium* spp. such as *M. pharaonis*, *Monomorium*, *Nylandria fulva*, *Pachycondyla chinensis*, *Paratrechina longicornis*, *Paravespula* spp., such as *P. germanica*, *P. pennsylvanica*, *P. vulgaris*; *Pheidole* spp. such as *P. megacephala*; *Pogonomyrmex* spp. such as *P. barbatus*, *P. californicus*, *Polistes rubiginosa*, *Prenolepis impairs*, *Pseudomyrmex gracilis*, *Schelipron* spp., *Sirex cyaneus*, *Solenopsis* spp. such as *S. geminata*, *S. invicta*, *S. molesta*, *S. richteri*, *S. xyloni*, *Sphecius speciosus*, *Sphex*spp., *Tapinoma* spp. such as *T. melanocephalum*, *T. sessile*; *Tetramorium* spp. such as *T. caespitum*, *T. bicarinatum*, *Vespa* spp. such as *V. crabro*; *Vespula* spp. such as *V. squamosal*; *Wasmannia auropunctata*, *Xylocopa* sp;

Insects of the order Orthoptera for example *Acheta domesticus*, *Calliptamus italicus*, *Chortoicetes terminifera*, *Ceuthophilus* spp., *Diastrammena asynamora*, *Dociostaurus maroccanus*, *Gryllotalpa* spp. such as *G. africana*, *G. gryllotalpa*; *Gryllus* spp., *Hieroglyphus daganensis*, *Kraussaria angulifera*, *Locusta* spp. such as *L. migratoria*, *L. pardalina*; *Melanoplus* spp. such as *M. bivittatus*, *M. femurrubrum*, *M. mexicanus*, *M. sanguiniDes*, *M. spretus*, *Nomadacris septemfasciata*, *Oedaleus senegalensis*, *Scapteriscus* spp., *Schistocerca* spp. such as *S. americana*, *S. gregaria*, *Stemopelmatus* spp., *Tachycines asynamorus*, and *Zonozerus variegatus*;

Pests from the Class Arachnida for example Acari, e.g. of the families Argasidae, Ixodidae and Sarcoptidae, such as *Ambiyomma* spp. (e.g. *A. americanum*, *A. variegatum*, *A. maculatum*), *Argas* spp. such as *A. persicu*), *Boophilus* spp. such as *B. annulatus*, *B. decoloratus*, *B. microplus*, *Dermacentorspp.* such as *D. silvarum*, *D. andersoni*, *D. variabilis*, *Hyalomma* spp. such as *H. truncatum*, *Ixodes* spp. such as *I. ricinus*, *I. rubicundus*, *I. scapularis*, *I. holocyclus*, *I. pacificus*, *Rhipicephalus sanguineus*, *Ornithodorus* spp. such as *O. moubata*, *O. hermsi*, *O. turicata*, *Ornithonyssus bacoti*, *Otobius megnini*, *Dermanyssus gallinae*, *Psoroptes* spp. such as *P. ovis*, *Rhipicephalus* spp. such as *R. sanguineus*, *R. appendiculatus*, *Rhipicephalus evertsi*, *Rhizoglyphus* spp., *Sarcoptes* spp. such as *S. Scabiei* and Family *Eriophyidae* including *Aceria* spp. such as *A. sheldoni*, *A. anthocoptes*, *Acallitus* spp., *Aculops* spp. such as *A. lycopersici*, *A. pelekassi Aculus* spp. such as *A. schlechtendali*; *Colomerus vitis*, *Epitrimerus pyri*, *Phyllocoptruta oleivora*; *Eriophytes ribis* and *Eriophyes* spp. such as *Eriophyes sheidoni*; Family Tarsonemidae including *Hemitarsonemus* spp., *Phytonemus pallidus* and *Polyphagotarsonemus latus*, *Stenotarsonemus* spp. *Steneotarsonemus spinki*; Family Tenuipalpidae including *Brevipalpus* spp. such as *B. phoenicis*; Family Tetranychidae including *Eotetranychus* spp., *Eutetranychus* spp., *Oligonychus* spp., *Petrobia latens*, *Tetranychus* spp. such as *T. cinnabarinus*, *T. evansi*, *T. kanzawai*, *T. pacificus*, *T. phaseulus*, *T. telarius* and *T. urticae*; *Bryobia praetiosa*; *Panonychus* spp. such as *P. ulmi*, *P. citri Metatetranychus* spp. and *Oligonychus* spp. such as *O. pratensis*, *O. perseae*, *Vasates lycopersici Raoiella indica*, Family Carpoglyphidae including *Carpoglyphus* spp.; *Penthaleidae* spp. such as *Haiotydeus destructor*, Family Demodicidae with species such as *Demodex* spp.; Family Trombicidea including *Trombicula* spp.; Family Macronyssidae including *Ornothonyssus* spp.; Family Pyemotidae including *Pyemotes tritici*; *Tyrophagus putrescentiae*; Family Acaridae including *Acarus siro*; Family Araneida including *Latrodectus mactans*, *Tegenaria agrestis*, *Chiracanthium* sp, *Lycosa* sp *Achaearanea tepidariorum* and *Loxosceles reclusa*;

Pests from the Phylum Nematoda, for example, plant parasitic nematodes such as root-knot nematodes, *Meoidogyne* spp. such as *M. hapla*, *M. incognita*, *M. javanica*; cyst-forming nematodes, *Globodera* spp. such as *G. rostochiensis*; *Heterodera* spp. such as *H. avenae*, *H. glycines*, *H. schachtii*, *H. trifolii*; Seed gall nematodes, *Anguina* spp.; Stem and foliar nematodes, *Aphelenchoides* spp. such as *A. besseyi*; Sting nematodes, *Belonolaimus* spp. such as *B. longicaudatus*; Pine nematodes, *Bursaphelenchus* spp. such as *B. lignicolus*, *B. xylophilus*; Ring nematodes, *Criconema* spp., *Criconemella* spp. such as *C. xenoplax* and *C. ornata*; and, *Criconemoides* spp. such as *Criconemoides informis*; *Mesocriconema* spp.; Stem and bulb nematodes, *Ditylenchus* spp. such as *D. destructor*, *D. diosac*; Awl nematodes, *Dolichodorus* spp.; Spiral nematodes, *Heiiocotylenchus multicinctus*; Sheath and sheathoid nematodes, *Hemicycliophora* spp. and *Hemicriconemoides* spp.; *Hirshmanniella* spp.; Lance nematodes, *Hoploaimus* spp.; False rootknot nematodes, *Nacobbus* spp.; Needle nematodes, *Longidorus* spp. such as *L. elongatus*; Lesion nematodes, *Pratylenchus* spp. such as *P. brachyurus*, *P. neglectus*, *P. penetrans*, *P. curvitatus*, *P. goodeyi*; Burrowing nematodes, *Radopholus* spp. such as *R. similis*; *Rhadopholus* spp.; *Rhodopholus* spp.; Reniform nematodes, *Rotylenchus* spp. such as *R. robustus*, *R. reniformis*; *Scutellonema* spp.; Stubby-root nematode, *Trichodorus* spp. such as *T. obtusus*, *T. primitivus*; *Paratrichodorus* spp. such as *P. minor*; Stunt nematodes, *Tylenchorhynchus* spp. such as *T. claytoni*, *T. dubius*; Citrus nematodes, *Tylenchulus* spp. such as *T. semipenetrans*; Dagger nematodes, *Xiphinema* spp.; and other plant parasitic nematode species;

Insects of the order Blattodea for example *Macrotermes* spp. such as *M. natalensis*; *Cornitermes cumulans*, *Procornitermes* spp., *Globitermes sulfureus*, *Neocapritermes* spp. such as *N. opacus*, *N. parvus*; *Odontotermes* spp., *Nasutitermes* spp. such as *N. corniger*, *Coptotermes* spp. such as *C. formosanus*, *C. gestroi*, *C. acinaciformis*; *Reticulitermes* spp. such as *R. hesperus*, *R. tibialis*, *R. speratus*, *R. flavipes*, *R. grassei*, *R. lucifugus*, *R. virginicus*; *Heterotermes* spp. such as *H. aureus*, *H. longiceps*, *H. tenuis*; *Cryptotermes* spp. such as *C. brevis*, *C. cavifrons*; *Incisitermes* spp. such as *I. minor*, *I. snyden*; *Marginitermes hubbardi*, *Kalotermes flavicollis*, *Neotermes* spp. such as *N. castaneus*, *Zootermopsis* spp. such as *Z. angusticollis*, *Z. nevadensis*, *Mastotermes* spp. such as *M. darwiniensis*; *Blatta* spp. such as *B. orientalis*, *B. lateralis*; *Blattella* spp. such as *B. asahinae*, *B. germanica*; *Rhyparobia maderae*, *Panchlora nivea*, *Periplaneta* spp. such as *P. americana*, *P. australasiae*, *P. brunnea*, *P. fuliginosa*, *P. japonica*; *Supella longipalpa*, *Parcoblatta pennsylvanica*, *Eurycotis floridana*, *Pycnoscelus surinamensis*, Insects of the order Siphonoptera for example *Cediopsylla simples*, *Ceratophyllus* spp., *Ctenocephalides* spp. such as *C. felis*, *C. canis*, *Xenopsylla cheopis*, *Pulexirritans*, *Trichodectes canis*, *Tungapenetrans*, and *Nosopsyllus fasciatus*, Insects of the order Thysanura for example *Lepisma saccharina*, *Ctenolepisma urbana*, and *Thermobia domestica*, Pests from the class Chilopoda for example *Geophilus* spp., *Scutigera* spp. such as *Scutigera coleoptrata*;

Pests from the class Diplopoda for example *Blaniulus guttulatus*, *Julus* spp., *Narceus* spp., Pests from the class Symphyla for example *Scutigerella immaculata*, Insects of the order Dermaptera, for example *Forficula auricularia*, Insects of the order Collembola, for example *Onychiurus* spp., such as *Onychiurus armatus*, Pests of the order Isopoda for example, *Armadillidium vulgare*, *Oniscus asellus*, *Porcellio scaber*, Insects of the order Phthiraptera, for example *Damalinia* spp., *Pediculus* spp. such as *Pediculus humanus capitis*. *Pediculus humanus corporis*, *Pediculus humanus humanus*; *Pthirus pubis*, *Haematopinus* spp. such as *Haematopinus eurysternus*, *Haematopinus suis*; *Linognathus* spp. such as *Linognathus vituli*; *Bovicola bovis*, *Menopon gallinae*, *Menacanthus stramineus* and *Solenopotes capillatus*, *Trichodectes* spp., Examples of further pest species which may be controlled by compounds of formula (I) include: from the Phylum Mollusca, class Bivalvia, for example, *Dreissena* spp.; class Gastropoda, for example, *Arion* spp., *Biomphalaria* spp., *Bulinus* spp., *Deroceras* spp., *Galba* spp., *Lymnaea* spp., *Oncomelania* spp., *Pomacea canaliclata*, *Succinea* spp.; from the class of the helminths, for example, *Ancylostoma duodenale*, *Ancylostoma ceylanicum*, *Acylostoma braziliensis*, *Ancylostoma* spp., *Ascaris lumbricoides*, *Ascaris* spp., *Brugia malayi*, *Brugia timori*, *Bunostomum* spp., *Chabertia* spp., *Clonorchis* spp., *Cooperia* spp., *Dicrocoelium* spp., *Dictyocaulus filaria*, *Diphyllobothrium latum*, *Dracunculus medinensis*, *Echinococcus granulosus*, *Echinococcus multilocularis*, *Enterobius vermicularis*, *Faciolaspp.*, *H aemonchus* spp. such as *Haemonchus contortus*; *Heterakis* spp., *Hymenolepis nana*, *Hyostrongulus* spp., *Loa Loa*, *Nematodirus* spp., *Oesophagostomum* spp., *Opisthorchis* spp.,

*Onchocerca volvulus, Ostertagia* spp., *Paragonimus* spp., *Schistosomen* spp., *Strongyloides fuelleborni, Strongyloides stercora is, Stronyloides* spp., *Taenia saginata, Taenia solium, Trichinella spiralis, Trichinella nativa, Trichinella britovi, Trichinella nelsoni, Trichinella pseudopsiralis, Trichostrongulus* spp., *Trichuris trichiura, Wuchereria bancrofti.*

In the context of the present invention, the term "crop" refers to both, growing and harvested crops.

In the context of the present invention, the term "plant" includes cereals, e.g. durum and other wheat, rye, barley, triticale, oats, rice, or maize (fodder maize and sugar maize/sweet and field corn); beet, e.g. sugar beet or fodder beet; fruits, such as pomes, stone fruits or soft fruits, e.g. apples, pears, plums, peaches, nectarines, almonds, cherries, papayas, strawberries, raspberries, blackberries or gooseberries; leguminous plants, such as beans, lentils, peas, alfalfa or soybeans; oil plants, such as rapeseed (oilseed rape), turnip rape, mustard, olives, sunflowers, coconut, cocoa beans, castor oil plants, oil palms, ground nuts or soybeans; cucurbits, such as squashes, pumpkins, cucumber or melons; fiber plants, such as cotton, flax, hemp or jute; citrus fruit, such as oranges, lemons, grapefruits or mandarins; vegetables, such as eggplant, spinach, lettuce (e.g. iceberg lettuce), chicory, cabbage, asparagus, cabbages, carrots, onions, garlic, leeks, tomatoes, potatoes, cucurbits or sweet peppers; lauraceous plants, such as avocados, cinnamon or camphor; energy and raw material plants, such as corn, soybean, rapeseed, sugar cane or oil palm; tobacco; nuts, e.g. walnuts; pistachios; coffee; tea; bananas; vines (table grapes and grape juice grape vines); hop; sweet leaf (also called *Stevia*); natural rubber plants or ornamental and forestry plants, such as flowers (e.g. carnation, petunias, geranium/pelargoniums, pansies and impatiens), shrubs, broad-leaved trees (e.g. poplar) or evergreens, e.g. conifers; eucalyptus; turf; lawn; grass such as grass for animal feed or ornamental uses. Preferred plants include potatoes sugar beets, tobacco, wheat, rye, barley, oats, rice, corn, cotton, soybeans, rapeseed, legumes, sunflowers, coffee or sugar cane; fruits; vines; ornamentals; or vegetables, such as cucumbers, tomatoes, beans or squashes.

The term "cultivated plants" is to be understood as including plants which have been modified by mutagenesis or genetic engineering in order to provide a new trait to a plant or to modify an already present trait.

Mutagenesis includes techniques of random mutagenesis using X-rays or mutagenic chemicals, but also techniques of targeted mutagenesis, in order to create mutations at a specific locus of a plant genome. Targeted mutagenesis techniques frequently use oligonucleotides or proteins like CRISPR/Cas, zinc-finger nucleases, TALENs or meganucleases to achieve the targeting effect.

Genetic engineering usually uses recombinant DNA techniques to create modifications in a plant genome which under natural circumstances cannot readily be obtained by cross breeding, mutagenesis or natural recombination. Typically, one or more genes are integrated into the genome of a plant in order to add a trait or improve a trait. These integrated genes are also referred to as transgenes in the art, while plants comprising such transgenes are referred to as transgenic plants. The process of plant transformation usually produces several transformation events, which differ in the genomic locus in which a transgene has been integrated. Plants comprising a specific transgene on a specific genomic locus are usually described as comprising a specific "event", which is referred to by a specific event name. Traits which have been introduced in plants or have been modified include in particular herbicide tolerance, insect resistance, increased yield and tolerance to abiotic conditions, like drought.

Herbicide tolerance has been created by using mutagenesis as well as using genetic engineering. Plants which have been rendered tolerant to acetolactate synthase (ALS) inhibitor herbicides by conventional methods of mutagenesis and breeding comprise plant varieties commercially available under the name Clearfield®. However, most of the herbicide tolerance traits have been created via the use of transgenes.

Herbicide tolerance has been created to glyphosate, glufosinate, 2,4-D, dicamba, oxynil herbicides, like bromoxynil and ioxynil, sulfonylurea herbicides, ALS inhibitor herbicides and 4-hydroxyphenylpyruvate dioxygenase (HPPD) inhibitors, like isoxaflutole and mesotrione.

Transgenes which have been used to provide herbicide tolerance traits comprise: for tolerance to glyphosate: cp4 epsps, epsps grg23ace5, mepsps, 2mepsps, gat4601, gat4621 and goxv247, for tolerance to glufosinate: pat and bar, for tolerance to 2,4-D: aad-1 and aad-12, for tolerance to dicamba: dmo, for tolerance to oxynil herbicies: bxn, for tolerance to sulfonylurea herbicides: zm-hra, csr1-2, gm-hra, S4-HrA, for tolerance to ALS inhibitor herbicides: csr1-2, for tolerance to HPPD inhibitor herbicides: hppdPF, W336 and avhppd-03.

Transgenic corn events comprising herbicide tolerance genes are for example, but not excluding others, DAS40278, MON801, MON802, MON809, MON810, MON832, MON87411, MON87419, MON87427, MON88017, MON89034, NK603, GA21, MZHG0JG, HCEM485, VCO-Ø1981-5, 676, 678, 680, 33121, 4114, 59122, 98140, Bt10, Bt176, CBH-351, DBT418, DLL25, MS3, MS6, MZIR098, T25, TC1507 and TC6275.

Transgenic soybean events comprising herbicide tolerance genes are for example, but not excluding others, GTS 40-3-2, MON87705, MON87708, MON87712, MON87769, MON89788, A2704-12, A2704-21, A5547-127, A5547-35, DP356043, DAS44406-6, DAS68416-4, DAS-81419-2, GU262, SYHTØH2, W62, W98, FG72 and CV127.

Transgenic cotton events comprising herbicide tolerance genes are for example, but not excluding others, 19-51a, 31707, 42317, 81910, 281-24-236, 3006-210-23, BXN10211, BXN10215, BXN10222, BXN10224, MON1445, MON1698, MON88701, MON88913, GHB119, GHB614, LLCotton25, T303-3 and T304-40.

Transgenic canola events comprising herbicide tolerance genes are for example, but not excluding others, MON88302, HCR-1, HCN10, HCN28, HCN92, MS1, MS8, PHY14, PHY23, PHY35, PHY36, RF1, RF2 and RF3.

Insect resistance has mainly been created by transferring bacterial genes for insecticidal proteins to plants. Transgenes which have most frequently been used are toxin genes of *Bacillus* spec. and synthetic variants thereof, like cry1A, cry1Ab, cry1Ab-Ac, cry1Ac, cry1A.105, cry1F, cry1Fa2, cry2Ab2, cry2Ae, mcry3A, ecry3.1Ab, cry3Bb1, cry34Ab1, cry35Ab1, cry9C, vip3(a), vip3Aa20. However, also genes of plant origin have been transferred to other plants. In particular genes coding for protease inhibitors, like CpTI and pinII. A further approach uses transgenes in order to produce double stranded RNA in plants to target and downregulate insect genes. An example for such a transgene is dvsnf7.

Transgenic corn events comprising genes for insecticidal proteins or double stranded RNA are for example, but not excluding others, Bt10, Bt11, Bt176, MON801, MON802, MON809, MON810, MON863, MON87411, MON88017, MON89034, 33121, 4114, 5307, 59122, TC1507, TC6275, CBH-351, MIR162, DBT418 and MZIR098.

Transgenic soybean events comprising genes for insecticidal proteins are for example, but not excluding others, MON87701, MON87751 and DAS-81419.

Transgenic cotton events comprising genes for insecticidal proteins are for example, but not excluding others, SGK321, MON531, MON757, MON1076, MON15985, 31707, 31803, 31807, 31808, 42317, BNLA-601, Event1, COT67B, COT102, T303-3, T304-40, GFM Cry1A, GK12, MLS 9124, 281-24-236, 3006-210-23, GHB119 and SGK321.

Increased yield has been created by increasing ear biomass using the transgene athb17, being present in corn event MON87403, or by enhancing photosynthesis using the transgene bbx32, being present in the soybean event MON87712.

Cultivated plants comprising a modified oil content have been created by using the transgenes: gm-fad2-1, Pj.D6D, Nc.Fad3, fad2-1A and fatb1-A. Soybean events comprising at least one of these genes are: 260-05, MON87705 and MON87769.

Tolerance to abiotic conditions, in particular to tolerance to drought, has been created by using the transgene cspB, comprised by the corn event MON87460 and by using the transgene Hahb-4, comprised by soybean event IND-ØØ41Ø-5.

Traits are frequently combined by combining genes in a transformation event or by combining different events during the breeding process. Preferred combination of traits are herbicide tolerance to different groups of herbicides, insect tolerance to different kind of insects, in particular tolerance to lepidopteran and coleopteran insects, herbicide tolerance with one or several types of insect resistance, herbicide tolerance with increased yield as well as a combination of herbicide tolerance and tolerance to abiotic conditions.

Plants comprising singular or stacked traits as well as the genes and events providing these traits are well known in the art. For example, detailed information as to the mutagenized or integrated genes and the respective events are available from websites of the organizations "International Service for the Acquisition of Agri-biotech Applications (ISAAA)" (http://www.isaaa.org/gmapprovaldatabase) and the "Center for Environmental Risk Assessment (CERA)" (http://cera-gmc.org/GMCDatabase), Further information on specific events and methods to detect them can be found for canola events MS1, MS8, RF3, GT73, MON88302, KK179 in WO01/031042, WO01/041558, WO01/041558, WO02/036831, WO11/153186, WO13/003558, for cotton events MON1445, MON15985, MON531(MON15985), LLCotton25, MON88913, COT102, 281-24-236, 3006-210-23, COT67B, GHB614, T304-40, GHB119, MON88701, 81910 in WO02/034946, WO02/100163, WO02/100163, WO03/013224, WO04/072235, WO04/039986, WO05/103266, WO05/103266, WO06/128573, WO07/017186, WO08/122406, WO08/151780, WO12/134808, WO13/112527, for corn events GA21, MON810, DLL25, TC1507, MON863, MIR604, LY038, MON88017, 3272, 59122, NK603, MIR162, MON89034, 98140, 32138, MON87460, 5307, 4114, MON87427, DAS40278, MON87411, 33121, MON87403, MON87419 in WO98/044140, U.S. Ser. No. 02/102,582, U.S. Ser. No. 03/126,634, WO04/099447, WO04/011601, WO05/103301, WO05/061720, WO05/059103, WO06/098952, WO06/039376, US2007/292854, WO07/142840, WO07/140256, WO08/112019, WO09/103049, WO09/111263, WO10/077816, WO11/084621, WO11/062904, WO11/022469, WO13/169923, WO14/116854, WO15/053998, WO15/142571, for potato events E12, F10, J3, J55, V11, X17, Y9 in WO14/178910, WO14/178913, WO14/178941, WO14/179276, WO16/183445, WO17/062831, WO17/062825, for rice events LLRICE06, LLRICE601, LLRICE62 in WO00/026345, WO00/026356, WO00/026345 for soybean events H7-1, MON89788, A2704-12, A5547-127, DP305423, DP356043, MON87701, MON87769, CV127, MON87705, DAS68416-4, MON87708, MON87712, SYHT0H2, DAS81419, DAS81419×DAS44406-6, MON87751 in WO04/074492, WO06/130436, WO06/108674, WO06/108675, WO08/054747, WO08/002872, WO09/064652, WO09/102873, WO10/080829, WO10/037016, WO11/066384, WO11/034704, WO12/051199, WO12/082548, WO13/016527, WO13/016516, WO14/201235.

The use of form B on cultivated plants may result in effects which are specific to a cultivated plant comprising a certain gene or event. These effects might involve changes in growth behavior or changed resistance to biotic or abiotic stress factors.

Such effects may in particular comprise enhanced yield, enhanced resistance or tolerance to insects, nematodes, fungal, bacterial, mycoplasma, viral or viroid pathogens as well as early vigour, early or delayed ripening, cold or heat tolerance as well as changed amino acid or fatty acid spectrum or content.

It has surprisingly been found that the pesticidal activity of form B may be enhanced by the insecticidal trait of a modified plant. Furthermore, it has been found that the compounds of the present invention are suitable for preventing insects to become resistant to the insecticidal trait or for combating pests, which already have become resistant to the insecticidal trait of a modified plant. Moreover, form B may be suitable for combating pests, against which the insecticidal trait is not effective, so that a complementary insecticidal activity can advantageously be used.

The term "plant propagation material" refers to all the generative parts of the plant such as seeds and vegetative plant material such as cuttings and tubers (e.g. potatoes), which can be used for the multiplication of the plant. This includes seeds, roots, fruits, tubers, bulbs, rhizomes, shoots, sprouts and other parts of plants.

Seedlings and young plants, which are to be transplanted after germination or after emergence from soil, may also be included. These plant propagation materials may be treated prophylactically with a plant protection compound either at or before planting or transplanting.

The term "seed" embraces seeds and plant propagules of all kinds including but not limited to true seeds, seed pieces, suckers, corms, bulbs, fruit, tubers, grains, cuttings, cut shoots and the like, and means in a preferred embodiment true seeds.

A skilled person will readily appreciate that form B will be applied in a pesticidalya effective amount. In general, "pesticidally effective amount" means the amount of form B or the mixture with a further pesticied needed to achieve an observable effect on growth, including the effects of necrosis, death, retardation, prevention, and removal, destruction, or otherwise diminishing the occurrence and activity of the target organism. The pesticidally effective amount can vary for the various compounds/compositions used in the invention. A pesticidally effective amount of the compositions will also vary according to the prevailing conditions such as desired pesticidal effect and duration, weather, target species, locus, mode of application, and the like.

In the case of soil treatment, in furrow application or of application to the pests dwelling place or nest, the quantity of form B may range from 0.0001 to 500 g per 100 m², preferably from 0.001 to 20 g per 100 m².

For use in treating crop plants, e.g. by foliar application, the rate of application of the form B may be in the range of 0.0001 g to 4000 g per hectare, e.g. from 1 g to 2 kg per hectare or from 1 g to 750 g per hectare, desirably from 1 g to 100 g per hectare, more desirably from 10 g to 50 g per hectare, e.g., 10 to 20 g per hectare, 20 to 30 g per hectare, 30 to 40 g per hectare, or 40 to 50 g per hectare.

The form B of the present invention and the plant protection formulations containing form B are particularly suitable for use in the treatment of seeds in order to protect the seeds from insect pests, in particular from soil-living insect pests, and the resulting seedling's roots and shoots against soil pests and foliar insects. The invention therefore also relates to a method for the protection of seeds from insects, in particular from soil insects, and of the seedling's roots and shoots from insects, in particular from soil and foliar insects, said method comprising treating the seeds before sowing and/or after pregermination with a compound of the invention. The protection of the seedling's roots and shoots is preferred. More preferred is the protection of seedling's shoots from piercing and sucking insects, chewing insects and nematodes.

The term "seed treatment" comprises all suitable seed treatment techniques known in the art, such as seed dressing, seed coating, seed dusting, seed soaking, seed pelleting, and in-furrow application methods. Preferably, the seed treatment application of the active compound is carried out by spraying or by dusting the seeds before sowing of the plants and before emergence of the plants.

The invention also comprises seeds coated with or containing the active compound. The term "coated with and/or containing" generally signifies that the active ingredient is for the most part on the surface of the propagation product at the time of application, although a greater or lesser part of the ingredient may penetrate into the propagation product, depending on the method of application. When the said propagation product is (re)planted, it may absorb the active ingredient.

Suitable seed is for example seed of cereals, root crops, oil crops, vegetables, spices, ornamentals, for example seed of durum and other wheat, barley, oats, rye, maize (fodder maize and sugar maize/sweet and field corn), soybeans, oil crops, crucifers, cotton, sunflowers, bananas, rice, oilseed rape, turnip rape, sugarbeet, fodder beet, eggplants, potatoes, grass, lawn, turf, fodder grass, tomatoes, leeks, pumpkin/squash, cabbage, iceberg lettuce, pepper, cucumbers, melons, *Brassica* species, melons, beans, peas, garlic, onions, carrots, tuberous plants such as potatoes, sugar cane, tobacco, grapes, petunias, geranium/pelargoniums, pansies and impatiens.

In addition, the form B may also be used for the treatment of seeds from plants, which have been modified by mutagenisis or genetic engineering, and which e.g. tolerate the action of herbicides or fungicides or insecticides. Such modified plants have been described in detail above.

Conventional seed treatment formulations include for example flowable concentrates FS, powders for dry treatment DS, water dispersible powders for slurry treatment WS, and gel formulation GF. These formulations can be applied to the seed diluted or undiluted. Application to the seeds is carried out before sowing, either directly on the seeds or after having pregerminated the latter. Preferably, the formulations are applied such that germination is not included.

The concentrations of active substances in ready-to-use formulations are typically in the range from 0.01 to 60% by weight, in particular from 0.1 to 40% by weight. They are usually obtained by dilution, e.g. a two-to-tenfold dilution of the seed treatment formulation containing the crystalline form B.

In a preferred embodiment a FS formulation of form B is used for seed treatment. Typically, such a FS formulation comprises 1 to 800 g/l of active ingredient, 1 to 200 g/l of surfactant, 0 to 200 g/l of antifreezing agent, 0 to 400 g/l of binder, 0 to 200 g/l of a pigment and up to 1 liter of water.

The following illustrations and examples serve to illustrate the invention and should not be regarded as limiting.

FIGURES

Figure 4A:
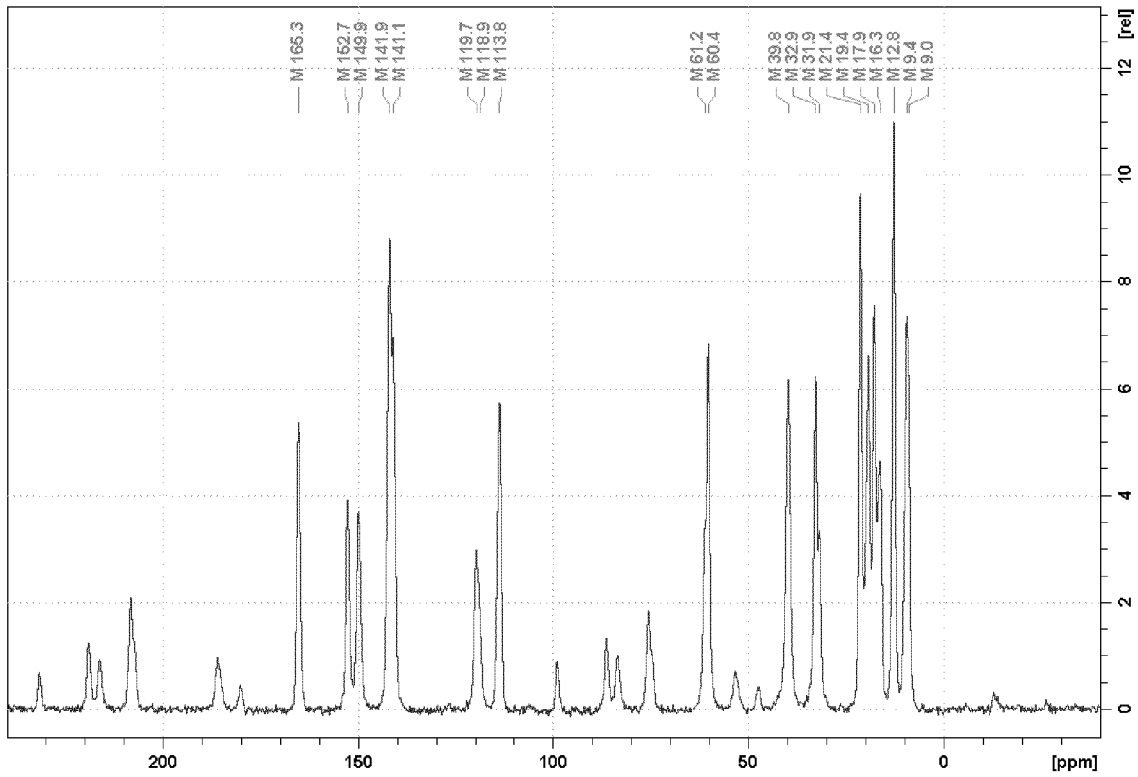

FIG. 4a shows the semiquantitative $^{13}C$ solid-state NMR spectrum of form B obtained from example 1 applying the analytical protocol 1.5(a). Figures on top of the peaks give the chemical shift vs. TMS.

Figure 4B:
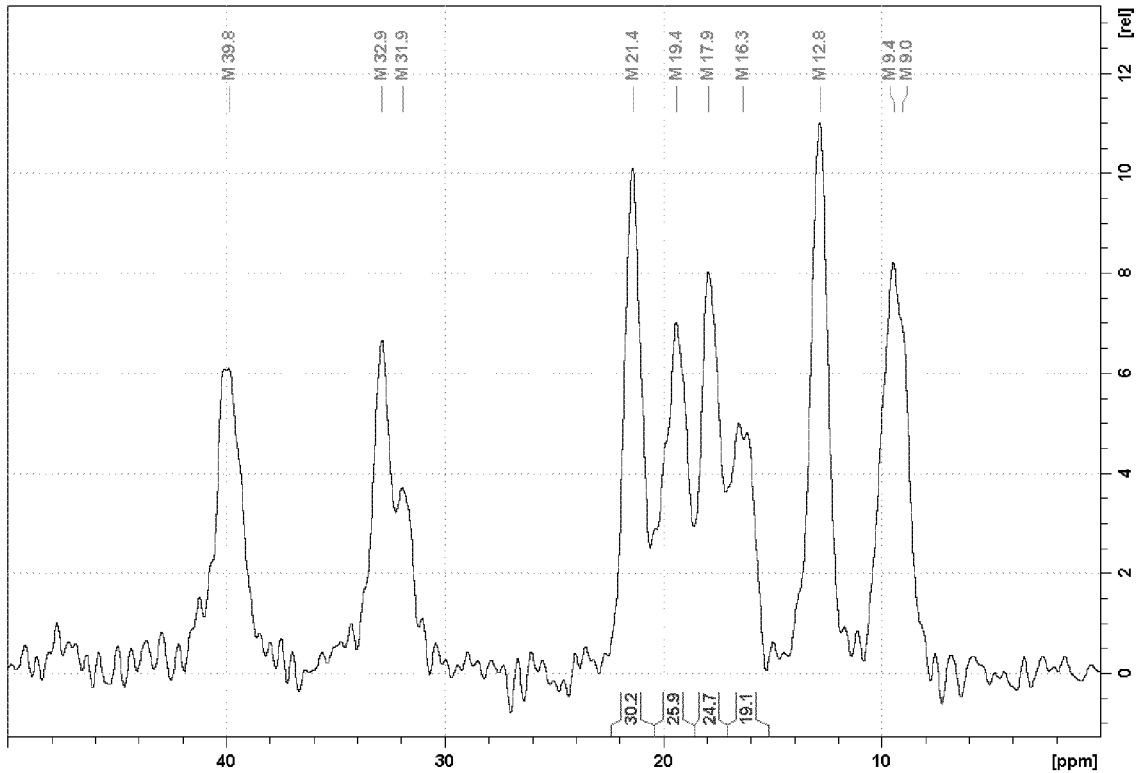

FIG. 4b shows the quantitative $^{13}C$ solid-state NMR spectrum of form B obtained from example 1 applying the analytical protocol 1.5(b) in the region from 50 to 0 ppm. Figures on top of the peaks give the chemical shift vs. TMS. Figures below the peaks are the integrals standardized to 100%.

Figure 5A:
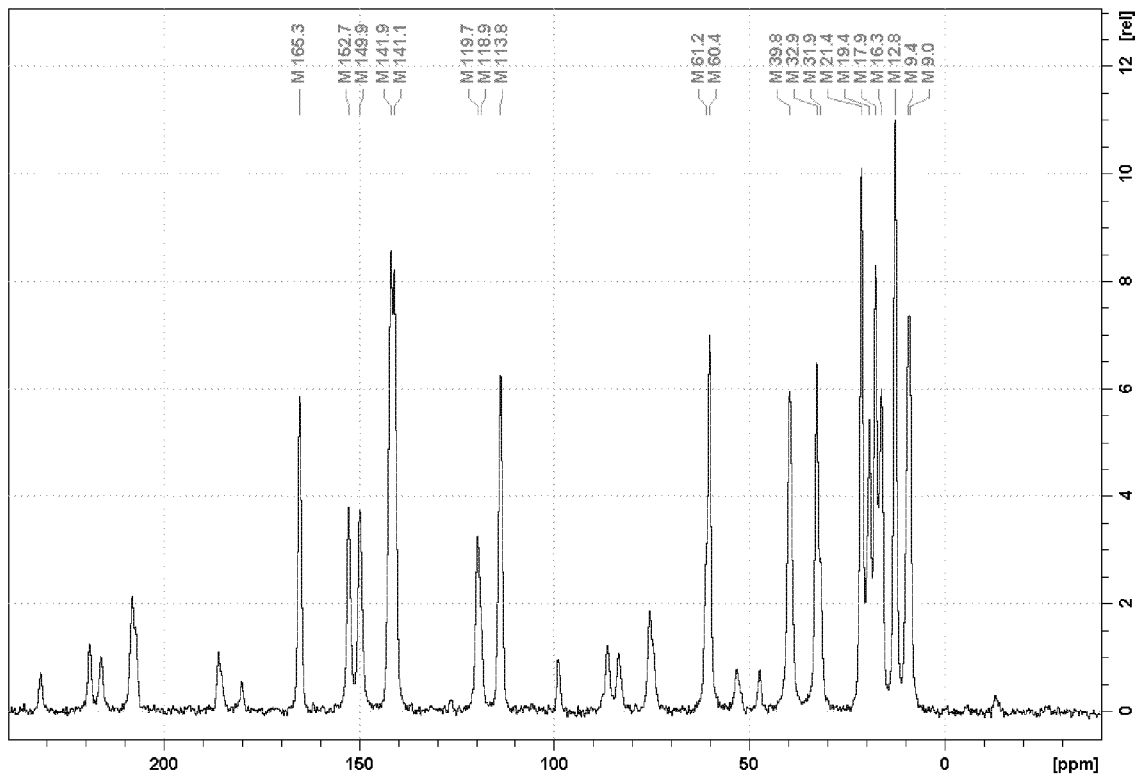

FIG. 5a shows the semiquantitative $^{13}C$ solid-state NMR spectrum of form A obtained from comparative example 1 applying the analytical protocol 1.5(a). Figures on top of the peaks give the chemical shift vs. TMS.

Figure 5B:
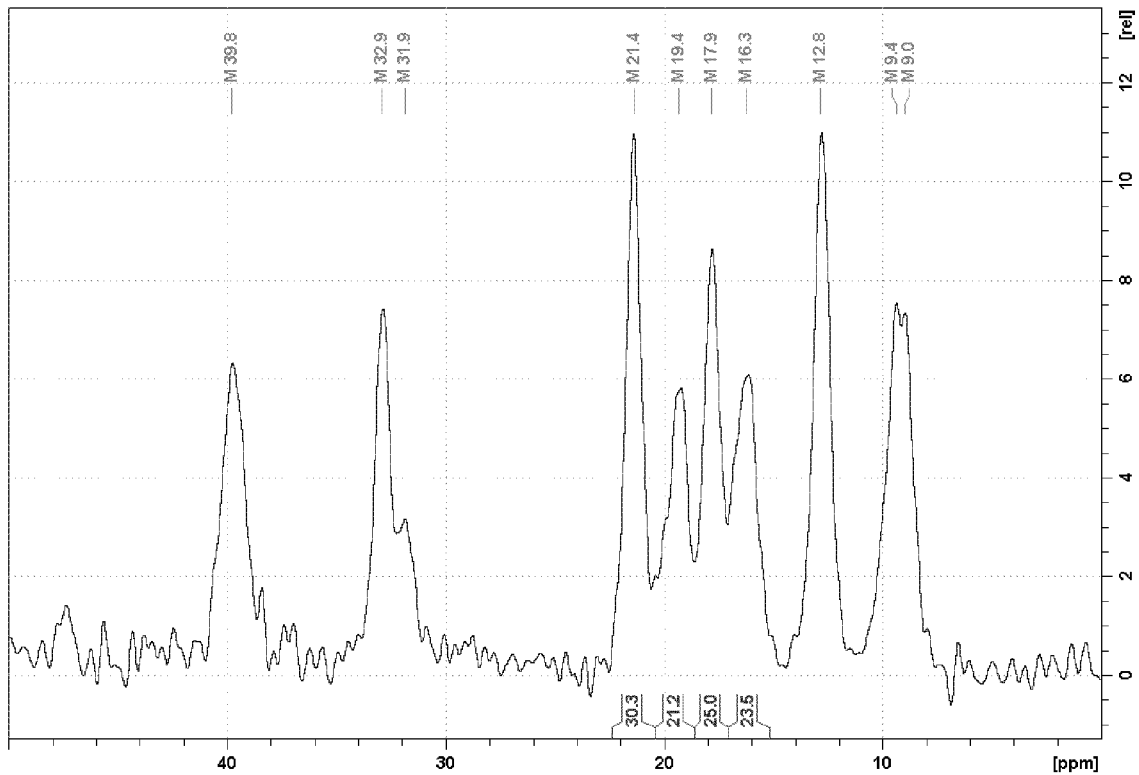

FIG. 5b shows the quantitative $^{13}C$ solid-state NMR spectrum of form A obtained from comparative example 1 applying the analytical protocol 1.5(b) in the region from 50 to 0 ppm. Figures on top of the peaks give the chemical shift vs. TMS. Figures below the peaks are the integrals standardized to 100%.

Figure 6:
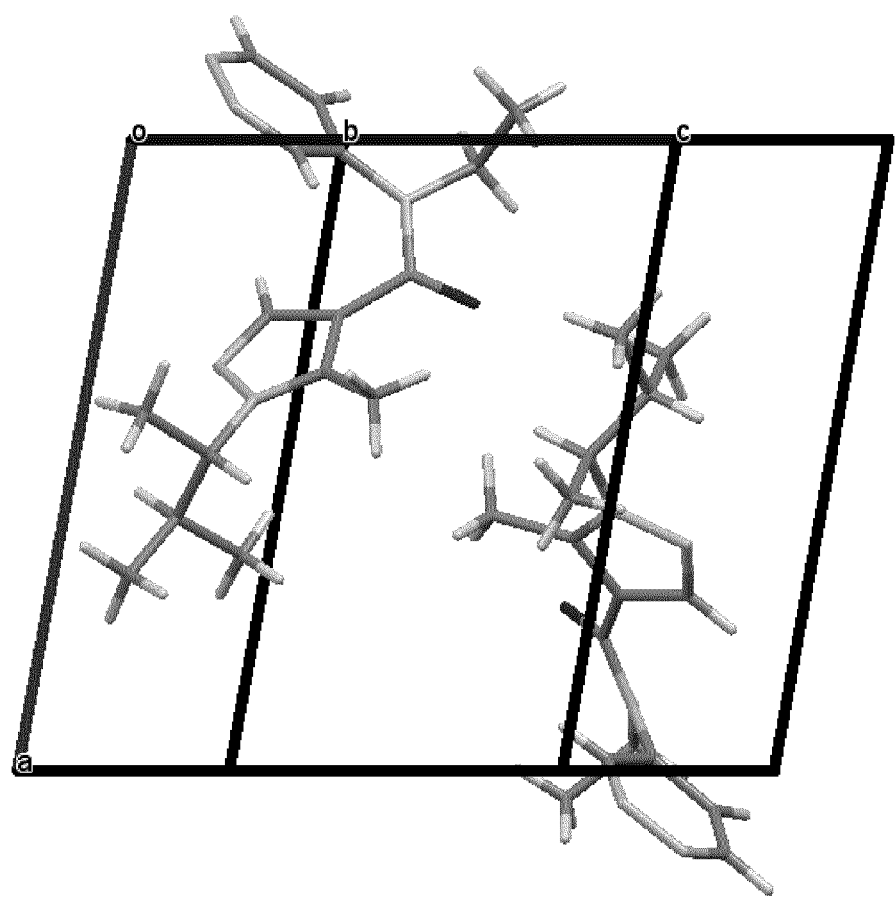

FIG. 6 shows the unit cell of the crystal structure of form B. Hydrogen atoms are not shown.

ANALYTICAL PROTOCOLS 1.1 Powder X-Ray Diffraction (PXRD)

Laboratory PXRD patterns were recorded with a PANalytical X'Pert Pro X-ray diffractometer using Cu Kα radiation in reflection geometry (Bragg-Brentano). The sample is placed in a silicon single crystal sample holder of 0.2 mm depth and gently and precisely flattened. The tube voltage is 45 kV and current is 40 mA. The PXRD data are collected at room temperature in the range from 2θ=3.0°-40.0° with increments of 0.017° and measurement time of 20 to 200 s/step.

1.2 Thermogravimetry (TGA)

TGA data were recorded with a TG/DTA 7200 (SII Nano Technology Inc). The samples were placed in platinum standard pans. The sample size in each case was 2 to 10 mg.

The heating rate was 10° C./min. The samples were purged with a stream of synthetic air during the experiment.

1.3. Dynamic Scanning Calorimetry (DSC)

DSC data were recorded with a Mettler Toledo DSC 823e/700/229 module. The samples were placed in aluminum standard pans. The sample size in each case was 1 to 10 mg. The heating rate was 10° C./min. The samples were purged with a stream of nitrogen during the experiment. The onset point of the endothermic event is reported as melting point.

1.4. Single Crystal X-Ray Diffraction.

A single crystal of dimensions was prepared as described in example 3 and subjected to single crystal X-ray diffraction for structure analysis. X-ray diffraction data were collected on a Bruker AXS 8D Pro-spector diffractometer at 100 K with Cu—Kα radiation (1.5418 Å). The images were processed with Saint (from Bruker AXS) and the structure was solved with SHELXS and refined with SHELXL.

1.5 Solid-State NMR spectroscopy (NMR)

NMR spectra form A and form B in the solid state were obtained with the following experimental conditions: 14.1T magnet (i.e., 600 MHz Larmor frequency), Bruker Avance Neo spectrometer with 3.2 mm Magic Angle Spinning probe, Zirconia rotors with Vespel caps, samples completely filling up the rotors, 10 kHz ($\omega/2\pi$) Magic Angle Spinning frequency;
  (a) cross-polarization experiment: 3.5 μs $^1$H 90°-pulse followed by 3 ms $^1$H-$^{13}$C cross-polarization under 50 kHz $^{13}$C and ca. 60 kHz (linearly ramped+/−10%)$^1$H radiofrequency spin-lock, with at least 512 scans with 2 s recycle delay;
  (b) one-pulse-acquisition experiment: $^{13}$C direct polarization with 5 μs 90°-pulse, acquisition of the free induction decay under 71 kHz TPPM-15 proton heteronuclear dipolar decoupling for 17 ms, at least 256 scans with 300 s recycle delay. Fourier transformation processing with 5 Hz exponential line broadening and manual zero- and first-order baseline correction. Resonance frequencies are reported relative to tetramethylsilane (TMS) in deuterated chloroform at 1% volume fraction under magic angle spinning, via solid adamantane as a secondary standard with a $^{13}$C methylene resonance at 37.77 ppm, in line with [IUPAC 2008] Eq. (6).

1.6 Particle Size Measurement

Particle size measurements of aqueous suspensions of forms A and B were carried out by dynamic light scattering using a using a Malvern Mastersizer 3000. The probes were diluted with a saturated aqueous solution of 1-(1,2-dimethylpropyl)-N-ethyl-5-methyl-N-pyridazin-4-yl-pyrazole-4-carboxamide to a solids content of about 0.1-1% by weight prior to the measurement.

1.7 Viscosity

Viscosities of the SC formulations of forms A and B were determined at 20° C. at shear rates from 1 s$^{-1}$ to 200 s$^{-1}$ using an Anton Paar Physica MCR 301 rheometer.

1.8 Microscopy

Microscopic analysis of the SC formulations of forms A and B was carried out at 50× magnification using a Nikon Eclipse ME600 microscope.

Preparation of Forms A and B by Crystallization from an Organic Solvent 1-(1,2-Dimethylpropyl)-N-ethyl-5-methyl-N-pyridazin-4-yl-pyrazole-4-carboxamide having a purity of >90% can be prepared by reacting 4-ethylaminopyridazine with 1-(1,2-dimethylpropyl)-5-methyl-pyrazole-4-carbonyl chloride in dichloromethane in the presence of trimethylamine by analogy to the protocol of example 1 of WO 2012/143317.

Example 1

Figure 1:
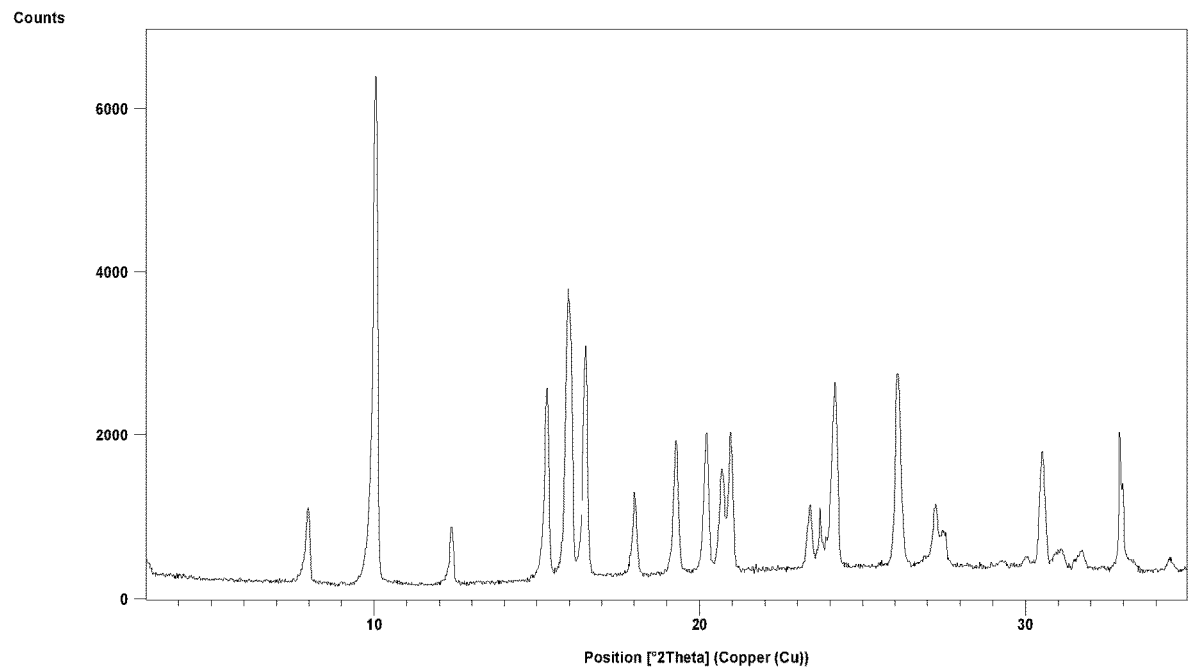
FIG. 1 shows an X-ray powder diffraction pattern of form B obtained from example 1 applying the analytical protocol 1.1.

In a glass tube equipped with a stirring bar 450 mg of 1-(1,2-dimethylpropyl)-N-ethyl-5-methyl-N-pyridazin-4-yl-pyrazole-4-carboxamide were dissolved in 3 mL of dry ethyl acetate (analytical grade) at 70° C. The solution was left for 1 h at 70° C. to achieve complete dissolution. The solution was cooled with stirring at a controlled cooling rate of 5° C./h to 0° C. Thereby, small crystals formed which were separated from the mother liquor and analyzed by powder X-ray diffractometry (PXRD). The X-ray diffraction pattern is shown in FIG. 1. $^{13}$C solid-state NMR spectra of the material against the standard tetramethylsilane (TMS, 1% in CDCl$_3$) showed the characteristic shifts given above for form B.

Example 2

In a glass tube equipped with a stirring bar 250 mg of 1-(1,2-dimethylpropyl)-N-ethyl-5-methyl-N-pyridazin-4-yl-pyrazole-4-carboxamide were dissolved in 3 mL of a mixture of 1 ml n-butyl acetate (analytical grade) and 2 ml of n-heptane (analytical grade) at 70° C. The mixture was left for 1 h at 70° C. to achieve complete dissolution. Thereby, small crystals formed which were separated from the mother liquor and analyzed by powder X-ray diffractometry (PXRD) and DSC. On the basis of the characteristic reflections, form B was identified.

Example 3

Crystals suitable for single crystal diffraction experiments can be obtained by slow evaporation of the solvent from a solution of form B in ethyl acetate at room temperature, as being clear from powder X-ray diffractometry.

Example 4

100 mg of crystalline form B obtained by the protocol of example 1 was milled for 5 minutes using mortar and pestel. The crystalline mass was analyzed by powder X-ray diffractometry. On the basis of the characteristic reflections, form B was identified.

A probe of 1-(1,2-dimethylpropyl)-N-ethyl-5-methyl-N-pyridazin-4-yl-pyrazole-4-carboxamide, which was identified as highly pure crystalline form B by PXRD, was analyzed by $^{13}$C solid state NMR, TGA and DSC. FIGS. 4a and 4b display the $^{13}$C solid state NMR of this probe. Melting point of the probe, as determined by DSC, was 89° C., the heat of fusion determined from the DSC of this probe was about 98 to 100 J/g. TGA revealed that no loss of material occurred during heating to 200° C.

Comparative Example 1

Figure 2:
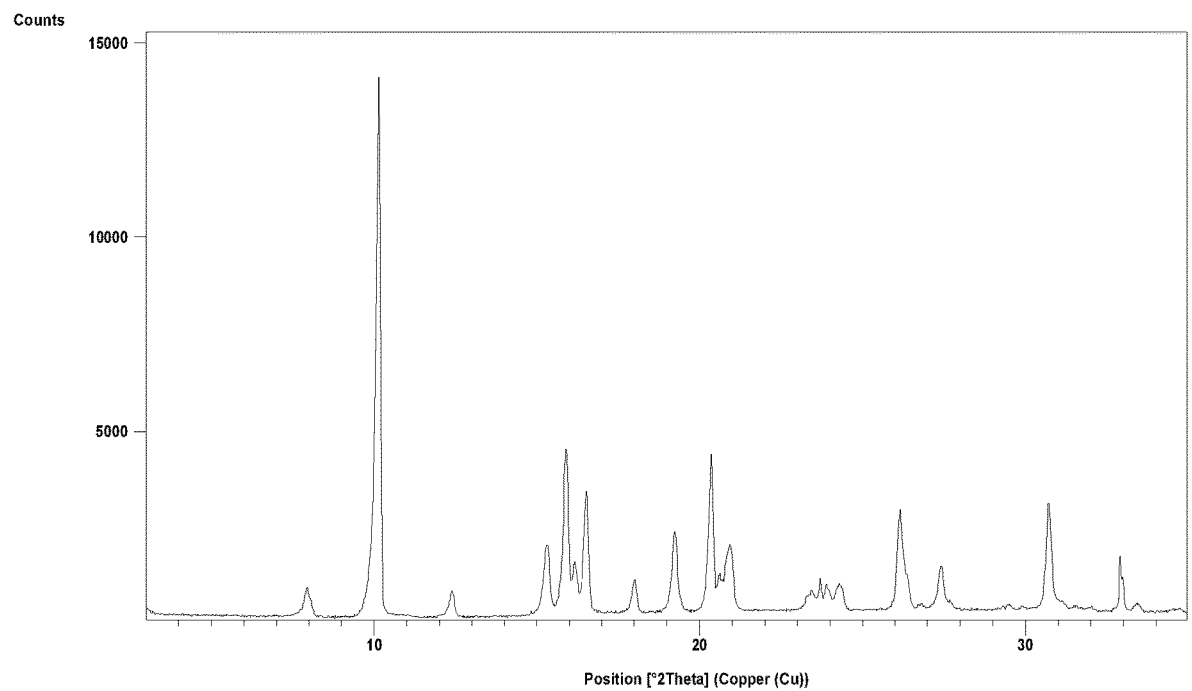
FIG. 2 shows an X-ray powder diffraction pattern of form A obtained from comparative example 1 applying the analytical protocol 1.1.
Figure 3A:
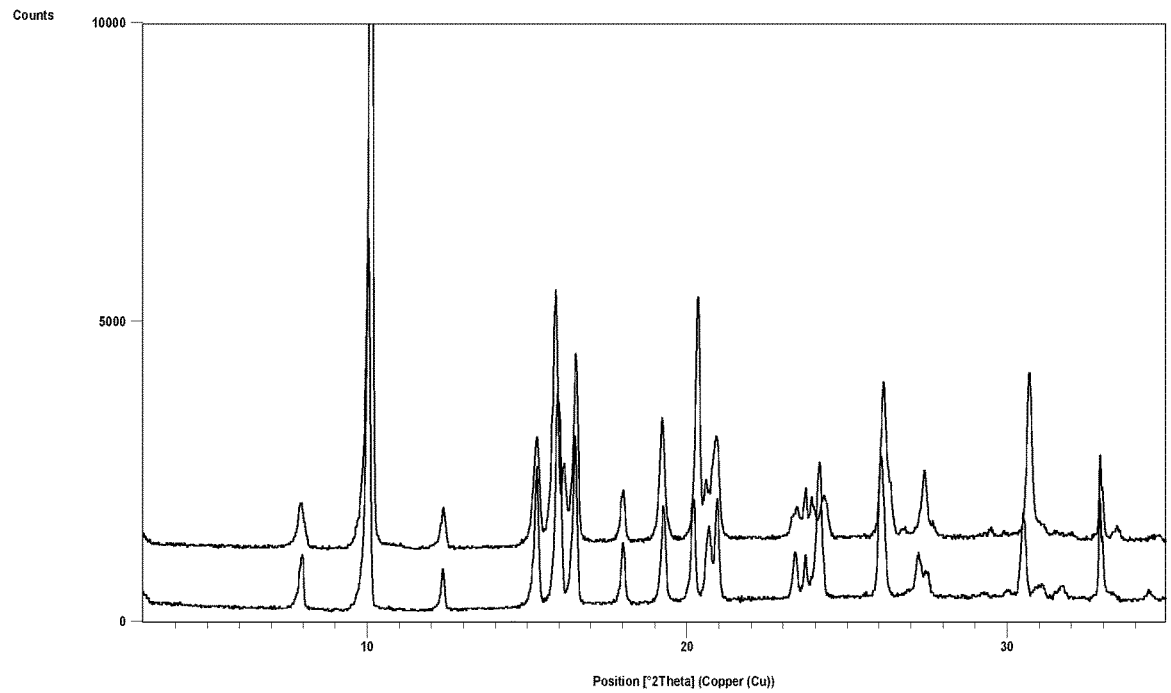
FIG. 3a shows superimposed X-ray powder diffraction patterns of form A (top) and form B (bottom).
Figure 3B:
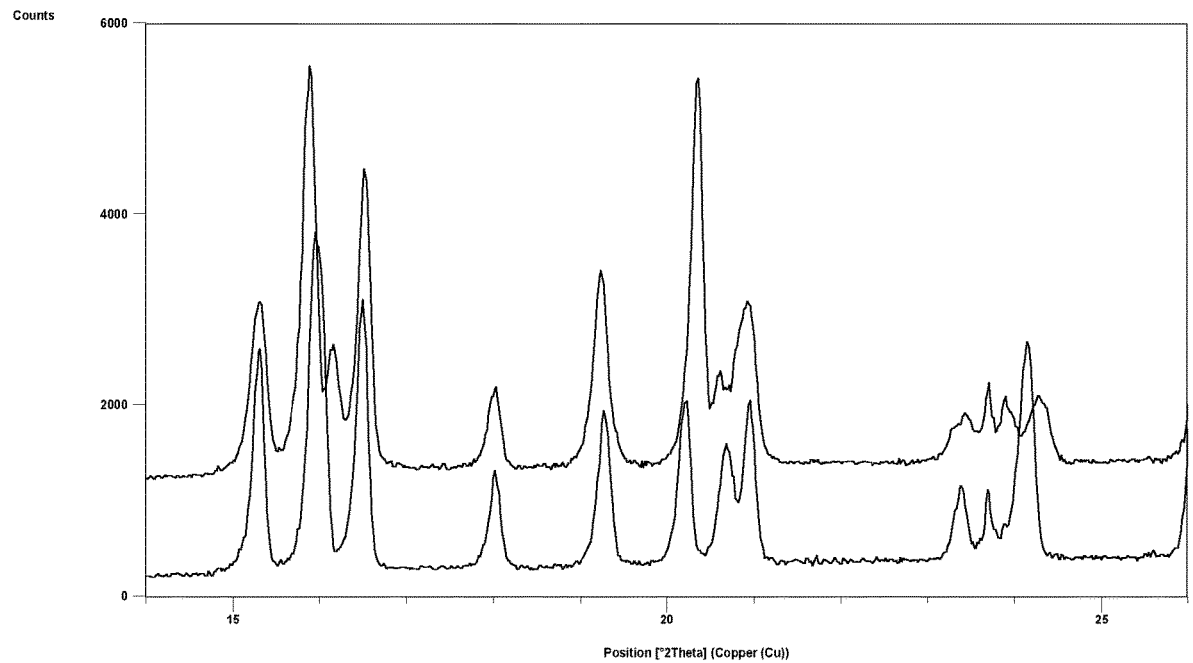
FIG. 3b shows an enlargement of superimposed X-ray powder diffraction patterns of form A (top) and form B (bottom) in 2θ range of 14-26°.

1-(1,2-Dimethylpropyl)-N-ethyl-5-methyl-N-pyridazin-4-yl-pyrazole-4-carboxamide was prepared by using the protocol of Example 1 of WO 2012/143317. Removal of solution obtained from the chromatographic workup to dryness resulted in a glassy material, which was analyzed by powder X-ray diffractometry (PXRD), $^{13}$C solid state NMR, TGA and DSC. The diffraction pattern of the material is shown in FIG. 2. The data reveal that he material corresponds to form A. The melting point was 87° C. TGA revealed that no loss of material occurred during heating to 200° C.

$^{13}C$ solid-state NMR spectra of the material against the standard tetramethylsilane (TMS, 1% in $CDCl_3$) showed the characteristic shifts given above for form A. The spectra are depicted in FIGS. 5a and 5b.

Comparative Example 2

1-(1,2-Dimethylpropyl)-N-ethyl-5-methyl-N-pyridazin-4-yl-pyrazole-4-carboxamide was prepared by using the protocol of Example 2 of WO 2012/143317. Removal of solution obtained from the chromatographic workup to dryness resulted in a glassy material, which was analyzed by powder X-ray diffractometry (PXRD) and DSC. On the basis of the characteristic reflections, form A was identified. The melting point was 87° C.

Comparative Examples 3.1-3.6

50 mg of form B were dissolved in 1 ml of the respective solvent at 60° C. At this temperature, the solvent was evaporated in a nitrogen stream. Solvents were methanol, isopropanol, dimethylformamide, 3-methylpentan-2-one, N-methylpyrrolidone, and pyridine. The obtained precipitate was analyzed by powder X-ray diffractometry. On the basis of the characteristic reflections, form A was identified.

Example 5

In a glass tube equipped with a stirring bar 50 mg of form A and 50 mg of form B were suspended in 1 mL water and stirred for 5 days at room temperature. The resulting solid was removed from the mother liquor and analyzed by PXRD. The PXRD complied with the data of crystalline form B.

Preparation of Aqueous Suspension Concentrate Formulation (SC Formulation) of Forms A and B Example 6

Form B of 1-(1,2-dimethylpropyl)-N-ethyl-5-methyl-N-pyridazin-4-yl-pyrazole-4-carboxamide was formulated as an aqueous suspension concentrate formulation (SC formulation) having the following overall composition given in Table 3:

TABLE 3

| Ingredient | g/L |
| --- | --- |
| Form B | 220.0 |
| Surfactant | 84.4 |
| Dispersant | 21.1 |
| Anti-settling agent | 10.6 |
| Defoamer | 4.2 |
| Preservative 1 | 2.1 |
| Preservative 2 | 1.1 |
| Thickener | 1.4 |
| Acetic acid | 1.1 |
| Water | ad 1 L |

Surfactant: Castor oil ethoxylate having on average 40 ethylenoxide units per molecule
Dispersant: Lignosulfonate—Greensperse® S9 of Borregard Lignotech
Anti-settling agent: Hydrophobic pyrogenic silica—Aerosil R 972 of Evonik
Defoamer: aqueous silicon emulsion—Silfoam® SRE of Wacker
Preservative 1: 20% aqueous suspension of benzisothiazolone
Preservative 2: aqueous formulation of 5-chloro-2-methyl-2H-isothiazol-3-one and 2-methyl-2H-isothiazol-3-one (3:1)—Acticide MV of Thor Chemie
Thickener: Xanthan gum Form B was mixed with the surfactant, the dispersant and a portion of the antifoam agent and a portion of water. The mixture was then ground in a bead mill with sufficient ball loading to ensure effective milling efficiency. The temperature of grinding head was controlled at 5° C. The milling was stopped when an average particle size of about 2 pm had been achieved (visually assessed with the Nikon Eclipse ME600 microscope at a magnification of 50×). To the thus obtained suspension the remaining antifoaming agent, the preservative and the thickener and remaining water were added to with stirring to ensure homogeneous distribution of components. The amount of water was chosen that the final concentration of 1-(1,2-dimethylpropyl)-N-ethyl-5-methyl-N-pyridazin-4-yl-pyrazole-4-carboxamide in the formulation was 220 g/l.

The viscosity of the freshly prepared SC formulation determined at 20° C. and a shear rate 100 $s^{-1}$ was 56.4 mPas.

Comparative Example 4

According to the protocol of example 6, form A of 1-(1,2-dimethylpropyl)-N-ethyl-5-methyl-N-pyridazin-4-yl-pyrazole-4-carboxamide was formulated as an aqueous suspension concentrate formulation (SC formulation) having the same overall composition as given for example 6, except that form B was replaced by form A.

The viscosity of the freshly prepared SC formulation determined at 20° C. and a shear rate 100 $s^{-1}$ was 52.1 mPas. The initial particle size was visually assessed by the Nikon Eclipse ME600 microscope at a magnification of 50×.

Assessment of Storage Stability

Probes of the respective formulations were stored for 12 weeks at −10° C. and at freeze-thaw cycling between −10° C. and 30° C. every 48 hours (FT). After storage, the particle size distribution and the viscosity of the probes were determined as described above. The results are summarized in the following tables 4 and 5:

TABLE 4

| | Particle Size Distribution after storage at −10° C. | | Particle Size Distribution after storage at FT | |
| --- | --- | --- | --- | --- |
| | $D_V(50)$ [µm] | $D_V(90)$ [µm] | $D_V(50)$ [µm] | $D_V(90)$ [µm] |
| Example 6 | 2.09 | 6.17 | 2.33 | 8.92 |
| Comparative example 4 | 3.02 | 9.48 | 5.25 | 17.2 |

TABLE 5

| | Viscosity at 20° C. and 100 $s^{-1}$ | | |
| --- | --- | --- | --- |
| | initial | After storage at −10° C. | After storage at FT |
| Example 6 | 56.4 | 68.0 | 58.3 |
| Comparative example 4 | 52.1 | 74.0 | 66.8 |

Furthermore, the respective probes were analysed with a microscope. For this, three probes were taken from each probe and analysed by microscopy with regard to the formation of large particles. The probes of the SC formulation of example 6 did not contain particles having a particle size of above 10 µm. In contrast thereto, the probes of the SC formulation of comparative example 4, which had been stored under freeze thaw conditions showed considerable particle growth with a large number of particles having a size in the range from 10 to 50 µm.

The results indicate that formulations containing Form A may become instable upon storage due to particle size growth.

The invention claimed is:

1. A crystalline form B of 1-(1,2-dimethylpropyl)-N-ethyl-5-methyl-N-pyridazin-4-yl-pyrazole-4-carboxamide, which in an X-ray powder diffraction diagram at 25° C. and Cu-Kα radiation displays the 3 following reflections, quoted as 2θ values: 20.69±0.10°, 24.15±0.10° and 30.52±0.10° and further displays at least two of the following reflections, quoted as 2θ values: 10.07±0.10°, 15.31±0.10°, 15.97±0.10° 16.50±0.10°, 19.29±0.10°, 20.22±0.10°, 20.96±0.10° and 26.09±0.10°.

2. The crystalline form B of claim 1, which in an X-ray powder diffraction diagram at 25° C. and Cu-Kα radiation further displays at least four of the following reflections, quoted as 2θ values: 10.07±0.10°, 15.31±0.10°, 15.97±0.10°, 16.50±0.10°, 19.29±0.10°, 20.22±0.10°, 20.96±0.10° and 26.09±0.10° and which further displays at least one of the following reflections, quoted as 2θ values: 7.99±0.10°, 12.38±0.10°, 18.03±0.10°, 23.40±0.10°, 23.70±0.10°, 27.26±0.10° and 32.91±0.10°.

3. The crystalline form B of claim 1, where form B is monoclinic with space group $P2_1$.

4. The crystalline form B of claim 1, which in a $^{13}C$ solid-state NMR spectrum shows the following peaks: 165.3±0.3, 152.7±0.3, 149.9±0.3, 141.9±0.3, 141.1±0.3, 119.7±0.3, 118.9±0.3, 113.8±0.3, 61.2±0.3, 60.4±0.3, 39.8±0.3, 32.9±0.3, 31.9±0.3, 21.4±0.3, 19.4±0.3, 17.9±0.3, 16.3±0.3, 12.8±0.3, 9.4±0.3 and 9.0±0.3 ppm.

5. The crystalline form B as claimed in claim 1 with a content of 1-(1,2-dimethylpropyl)-N-ethyl-5-methyl-N-pyridazin-4-yl-pyrazole-4-carboxamide of at least 94 wt. %.

6. Solid 1-(1,2-dimethylpropyl)-N-ethyl-5-methyl-N-pyridazin-4-yl-pyrazole-4-carboxamide consisting of at least 90 wt. % of the crystalline form B as defined in claim 1.

7. A plant protection formulation comprising crystalline form B of 1-(1,2-dimethylpropyl)-N-ethyl-5-methyl-N-pyridazin-4-yl-pyrazole-4-carboxamide as defined in claim 1 and one or more carriers customary for the formulation of plant protection formulations.

8. A plant protection formulation containing 1-(1,2-dimethylpropyl)-N-ethyl-5-methyl-N-pyridazin-4-yl-pyrazole-4-carboxamide and one or more carriers customary for the formulation of plant protection formulations, wherein the 1-(1,2-dimethylpropyl)-N-ethyl-5-methyl-N-pyridazin-4-yl-pyrazole-4-carboxamide consists of at least 90 wt. % of the crystalline form B as defined in claim 1.

9. The plant protection formulation as claimed in claim 7 which is in a form of an aqueous suspension concentrate or in a form of a non-aqueous suspension concentrate.

10. The plant protection formulation as claimed in claim 7 in a form of a powder or in a form of granules, which are dispersible in water.

11. An aqueous spray liquor, which is obtained by diluting a plant protection formulation as defined in claim 7 with water.

12. A method for combating or controlling invertebrate pests comprising contacting said pest or its food supply, or its habitat or breeding ground, with the crystalline form B of 1-(1,2-dimethylpropyl)-N-ethyl-5-methyl-N-pyridazin-4-yl-pyrazole-4-carboxamide as defined in claim 1.

13. A method for protecting crops, growing plants or plant propagation material from attack or infestation by invertebrate pests comprising contacting said crops, growing plants or plant propagation material or the soil or water in which the plant is growing with the crystalline form B of 1-(1,2-dimethylpropyl)-N-ethyl-5-methyl-N-pyridazin-4-yl-pyrazole-4-carboxamide as defined in claim 1.

\* \* \* \* \*